(12) United States Patent
Hurwitz

(10) Patent No.: US 11,240,047 B2
(45) Date of Patent: Feb. 1, 2022

(54) CAPACITOR BASED PHYSICAL UNCLONABLE FUNCTION

(71) Applicant: Analog Devices International Unlimited Company, Limerick (IE)

(72) Inventor: Jonathan Ephraim David Hurwitz, Edinburgh (GB)

(73) Assignee: Analog Devices International Unlimited Company, Limerick (IE)

( * ) Notice: Subject to any disclaimer, the term of this patent is extended or adjusted under 35 U.S.C. 154(b) by 45 days.

(21) Appl. No.: 16/716,435

(22) Filed: Dec. 16, 2019

(65) Prior Publication Data

US 2021/0184870 A1  Jun. 17, 2021

(51) Int. Cl.
*H04L 9/32* (2006.01)
*H04L 9/08* (2006.01)
*G06F 21/75* (2013.01)

(52) U.S. Cl.
CPC ............ *H04L 9/3278* (2013.01); *G06F 21/75* (2013.01); *H04L 9/0869* (2013.01)

(58) Field of Classification Search
CPC ....... H04L 9/3278; H04L 9/0869; H04L 9/32; H04L 9/08; G06F 21/75; G06F 21/70
See application file for complete search history.

(56) References Cited

U.S. PATENT DOCUMENTS

| | | | |
|---|---|---|---|
| 8,525,549 B1 | 9/2013 | Feng et al. | |
| 8,619,979 B2 | 12/2013 | Ficke et al. | |
| 9,018,972 B1 | 4/2015 | Gurrieri et al. | |
| 10,560,095 B2 | 2/2020 | O'Dwyer et al. | |
| 10,764,069 B1 | 9/2020 | Hurwitz | |
| 2012/0020145 A1 | 1/2012 | Huber et al. | |
| 2013/0322617 A1 | 12/2013 | Orshansky | |
| 2014/0279532 A1 | 9/2014 | Tremlet | |
| 2015/0058928 A1 | 2/2015 | Guo et al. | |
| 2017/0345116 A1 | 11/2017 | Katoh | |

(Continued)

FOREIGN PATENT DOCUMENTS

| | | |
|---|---|---|
| JP | 2017092885 A | 5/2017 |
| KR | 101408619 B1 | 6/2014 |

OTHER PUBLICATIONS

Kalyanaraman et al., Highly Secure Strong PUF based on Nonlinearity of MOSFET Subthreshold Operation. Thesis. Department of Electrical and Computer Engineering. The University of Texas at Austin. 2012; 13 pages.

(Continued)

*Primary Examiner* — Quazi Farooqui
(74) *Attorney, Agent, or Firm* — Wolf, Greenfield & Sacks, P.C.

(57) ABSTRACT

The present disclosure relates to a PUF apparatus for generating a persistent, random number. The random number is determined by selecting one or more PUF cells, each of which comprise a matched pair of capacitors that are of identical design, and determining a value that is accurately and reliably indicative of a random manufacturing difference between them, based in which the random number is generated. The random manufacturing differences between the capacitors creates the randomness in the generated random number. Furthermore, because the random manufacturing difference should be relatively stable over time, the generated random number should be persistent.

20 Claims, 15 Drawing Sheets

(56) References Cited

U.S. PATENT DOCUMENTS

| | | |
|---|---|---|
| 2017/0346644 A1 | 11/2017 | Cambou |
| 2018/0013431 A1 | 1/2018 | Bury et al. |
| 2018/0019881 A1 | 1/2018 | Pfeiffer et al. |
| 2018/0091300 A1 | 3/2018 | Tomishima |
| 2020/0287729 A1 | 9/2020 | Hurwitz |
| 2021/0091952 A1* | 3/2021 | Wentz .................. H04L 9/3247 |

OTHER PUBLICATIONS

Tang et al., A Physical Unclonable Function based on Capacitor Mismatch in a Charge-Redistribution SAR-ADC. 2018 IEEE International Symposium on Circuits and Systems. ISCAS 2018—Proceedings. May 2018; 5 pages.
U.S. Appl. No. 16/296,998, filed Mar. 8, 2019, Hurwitz.

* cited by examiner

CAPACITOR BASED PHYSICAL UNCLONABLE FUNCTION

FIELD OF THE DISCLOSURE

The present disclosure relates to capacitor based, physical unclonable function (PUF).

BACKGROUND

A physical unclonable function (sometimes also called physically unclonable function) or 'PUF' is a physical entity capable of generating an output ('response') to a given input ('challenge') that is unique to that particular PUF such that it can be regarded as a 'fingerprint'. This capacity is typically arrived at by devising the PUF in such a way that its output depends upon features that differ randomly in each device due to minor manufacturing variations. Thus, a PUF cannot be readily replicated with the correct fingerprint, even with full knowledge of its circuit layout. The response may be used for various different purposes, for example in cryptographic operations to secure communications to/from a device that includes the PUF, or used in a process of authenticating the identity of a device that includes the PUF, etc.

A PUF apparatus may comprise one or more PUF cells, each comprising some physical features that differ randomly in each device due to minor manufacturing variations, and some determination circuitry configured to readout a PUF value from each of the PUF cells. The PUF apparatus may be configured such that the determination circuitry can read out a random PUF value from each of the PUF cells and generate a persistent random number based on the PUF value(s). The persistent random number may then be used as part of the determination of a 'response' to a 'challenge'. For example, the PUF apparatus may receive a 'challenge' from another circuit, the determination circuitry may then read the persistent random number from the PUF cells and the PUF apparatus may then determine a 'response' based on the 'challenge' and the persistent random number (for example, by carrying out some cryptographic operation, such as a hash, or XOR, or encryption using the 'challenge' and the persistent random number). A persistent random number is random in that its value is dependent on the minor, random manufacturing variations between different PUF apparatus. Thus, different instances of the PUF apparatus, whilst identical in design, should each generate a different, persistent random number. A random number is 'persistent' in that it should stay the same, or stay the same within acceptable limits, over time. For example, the persistent random number generated by the one or more PUF cells of a PUF apparatus should be the same each time it is generated (or stay the same within acceptable limits, for example so that it can be corrected using error correcting code, ECC), so that it can act as a reliable fingerprint of the device.

BRIEF SUMMARY

The present disclosure relates to a PUF apparatus for generating a persistent, random number. The number is random in that each particular instance of the PUF apparatus should generate a randomly different number to all other instances of the PUF apparatus, and is persistent in that each particular instance of the PUF apparatus should repeatedly generate the same number, within acceptable error correction tolerances. The random number is determined by selecting one or more PUF cells, each of which comprise a matched pair of capacitors that are of identical design, and determining a value that is accurately and reliably indicative of a random manufacturing difference between them, based in which the random number is generated. The random manufacturing differences between the capacitors creates the randomness in the generated random number. Furthermore, because the random manufacturing difference should be relatively stable over time, the generated random number should be persistent.

In a first aspect of the present disclosure, there is provided a Physical Unclonable Function, PUF, apparatus comprising: a plurality of PUF cells, each PUF cell comprising: at least one capacitor divider comprising a first capacitor and a second capacitor sharing a common node; and a determination unit configured to: set a first bias condition across the at least one capacitor divider; determine a first nodal measurement that is indicative of a voltage at the common node of the at least one capacitor divider during the first bias condition; set a second bias condition across the at least one capacitor divider to change a distribution of charge held by the first capacitor and the second capacitor; determine a second nodal measurement that is indicative of a voltage at the common node of the at least one capacitor divider during the second bias condition; and determine a PUF output based at least in part on a difference between the first measurement and the second measurement.

The PUF output unit may be further configured to apply an initialisation voltage to the common node of the capacitor divider to set the charge held by the first capacitor and second capacitor.

At least one of the PUF cells may comprise a single capacitor divider, wherein the first nodal measurement comprises a measurement of a voltage at the common node during the first bias condition; and wherein the second nodal measurement comprises a measurement of a voltage at the common node during the second bias condition.

At least one of the plurality of PUF cells may further comprise a buffer configured to output a voltage or current indicative of the voltage at the common node of the capacitor dividers.

At least one of the PUF cells may comprise a first capacitor divider and a second capacitor divider, wherein the first nodal measurement comprises a measurement of a difference between a voltage at the common node of the first capacitor divider and a voltage at the common node of the second capacitor divider during the first bias condition; and wherein the second nodal measurement comprises a measurement of a difference between a voltage at the common node of the first capacitor divider and a voltage at the common node of the second capacitor divider during the second bias condition.

At least one of the plurality of PUF cells may further comprise at least one buffer configured to output a voltage or current indicative of a voltage at the common node of each of the capacitor dividers.

The buffer may form part of a comparator comprising a first input coupled to the common node of the first capacitor divider and a second input coupled to the common node of the second capacitor divider, wherein the output is a difference between the two inputs.

The comparator may form part of an analog to digital converter, wherein the first bias condition comprises applying a first time-varying voltage across the first capacitor divider and a second time-varying voltage across the second capacitor divider; and wherein the second bias condition comprises applying a third time-varying voltage across the first capacitor divider and a fourth time-varying voltage across the second capacitor divider. The analog to digital converter may comprise a slope converter or a SAR converter, or similar.

In any of the above described implementations, each PUF cell may comprise: a first PUF sub-cell comprising a first pair of capacitors of the at least one pair of capacitors, the first pair of capacitors sharing a first common node; and a second PUF sub-cell comprising a second pair of capacitors of the at least one pair of capacitors, the second pair of capacitors sharing a second common node, wherein the first PUF sub-cell is coupled to the second PUF sub-cell to form the PUF cell.

The first PUF sub-cell and the second PUF sub-cell may identical in design. The first PUF sub-cell and the second PUF sub-cell may be positioned adjacent each other to form the PUF cell, wherein each sub cell may comprise: a first output line; a second output line; and a line cross over where the position of the first output line and the second output line cross over, such that the first output line of the first PUF sub cell is coupled to the second output line of the adjacent second PUF sub cell and the second output line of the first PUF sub cell is coupled to the first output line of the adjacent second PUF sub cell. The first output line of each PUF sub-cell may be coupled to the respective common node of the PUF sub cell The first PUF sub-cell may comprises a first set of one or more transistors configured to form a first input of a differential amplifier, wherein the first common node is coupled to the first input of the differential amplifier; and the second PUF sub-cell may comprise: a second set of one or more transistors configured to form a second input of the differential amplifier, wherein the second common node is coupled to the second input of the differential amplifier; and wherein the first PUF sub-cell and the second sub-cell are coupled together such that the first set of one or more transistors and the second set of one or more transistors together form a differential input of the differential amplifier.

The first output line of each PUF sub-cell may be coupled to an output terminal of the respective set of transistors such that the first output line and the second output line carry a differential output of the differential amplifier.

The layout of the first PUF sub-cell and the second PUF sub-cell may be identical.

In a second aspect of the present disclosure, there is provided a method of determining a Physical Unclonable Function, PUF, output using a PUF cell comprising at least one capacitor divider comprising a first capacitor and a second capacitor sharing a common node, the method comprising: setting a first bias condition across the at least one capacitor divider; determining a first nodal measurement that is indicative of a voltage at the common node of the at least one capacitor divider during the first bias condition; setting a second bias condition across the at least one capacitor divider to change a distribution of charge held by the first capacitor and the second capacitor; determining a second nodal measurement that is indicative of a voltage at the common node of the at least one capacitor divider during the second bias condition; and determining the PUF output based at least in part on a difference between the first measurement and the second measurement.

The method may further comprise applying an initialisation voltage to the common node of the capacitor divider to set the charge held by the first capacitor and second capacitor.

The first nodal measurement may comprise a measurement of a voltage at the common node during the first bias condition, and the second nodal measurement may comprise a measurement of a voltage at the common node during the second bias condition.

The PUF cell may comprise a first capacitor divider and a second capacitor divider, wherein the first nodal measurement comprises a measurement of a difference between a voltage at the common node of the first capacitor divider and a voltage at the common node of the second capacitor divider during the first bias condition; and wherein the second nodal measurement comprises a measurement of a difference between a voltage at the common node of the first capacitor divider and a voltage at the common node of the second capacitor divider during the second bias condition.

The PUF cell may be further configured to output a voltage or current indicative of a difference between the voltage at the common node of the first capacitor divider and the voltage at the common node of the second capacitor divider, wherein the first bias condition comprises applying a first time-varying voltage across the first capacitor divider and a second time varying voltage across the second capacitor divider; and wherein the second bias condition comprises applying a third time-varying voltage across the first capacitor divider and a fourth time-varying voltage across the second capacitor divider.

In a third aspect of the present disclosure, there is provided a circuit for determining a persistent random number, the circuit comprising: a capacitive differential amplifier; and a determination unit configured to: determine a capacitor difference value; and determine the persistent random number based at least in part on the capacitor difference value, wherein the determination unit is configured to determine the capacitor difference value by: (a) applying a first common mode voltage at the differential inputs of the capacitive differential amplifier; (b) determining a first measurement of an output of the capacitive differential amplifier; (c) applying a second common mode voltage at the differential inputs of the capacitive differential amplifier; (d) determining a second measurement of the output of the capacitive differential amplifier; and (e) determining a difference between the first measurement and the second measurement.

The capacitive differential amplifier may comprise: an operational amplifier comprising a first input and a second input; and a plurality of pairs of input capacitors, wherein one capacitor of each pair is switchably coupled to the first input of the operational amplifier and the other capacitor of each pair is switchably coupled to the second input of the operational amplifier.

The capacitor difference value may comprise a first capacitor difference value and a second capacitor difference value, wherein the determination unit is configured to determine the first capacitor difference value by performing (a)-(e) when a first pair of the plurality of pairs of input capacitors are coupled to the first input and the second input of the operational amplifier, and wherein the determination unit is configured to determine the second capacitor difference value by performing (a)-(e) when a second pair of the plurality of pairs of input capacitors are coupled to the first input and the second input of the operational amplifier.

The circuit may further comprise a multiplexer arranged to switchably couple the plurality of pairs of input capacitors to the first input of the operational amplifier and the second input of the operational amplifier.

The determination unit may be is further configured to, before performing (a), apply an initialisation voltage to the capacitive differential amplifier.

In a fourth aspect of the present disclosure, there is provided a method for determining a persistent random number, the method comprising applying a first common mode voltage at differential inputs of a capacitive differential amplifier; determining a first measurement of an output of the capacitive differential amplifier; applying a second common mode voltage at the differential inputs of the capacitive differential amplifier; determining a second measurement of the output of the capacitive differential amplifier; determining a difference between the first measurement and the second measurement; and determining the persistent random number based at least in part on the capacitor difference value.

BRIEF DESCRIPTION OF THE DRAWINGS

Aspects of the present disclosure are described, by way of example only, with reference to the following drawings, in which.

DETAILED DESCRIPTION

Figure 1:
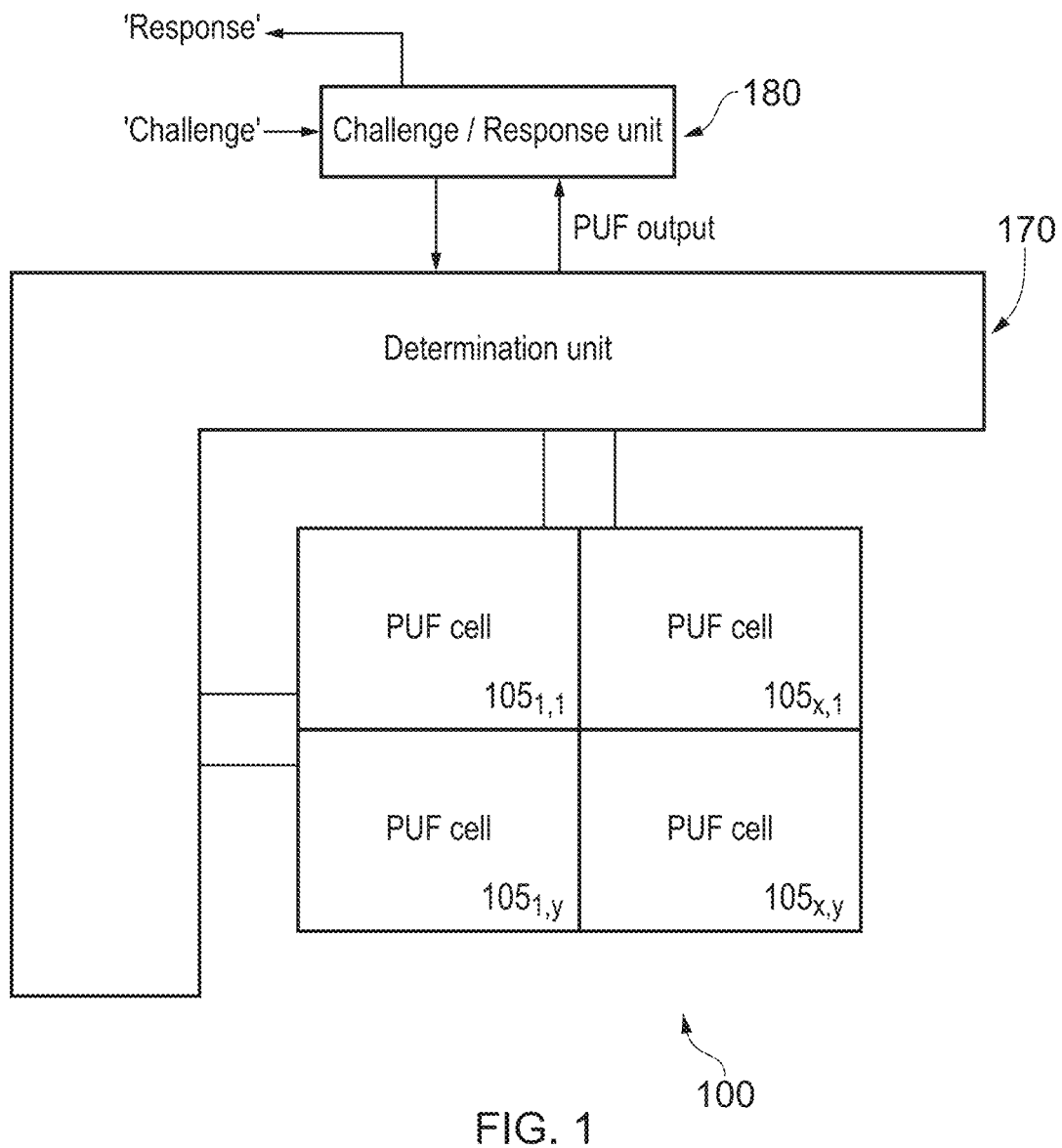
FIG. 1 shows an example schematic representation of PUF apparatus in accordance with an aspect of the present disclosure.

The inventors have identified many different challenges in implementing a PUF apparatus with one or more PUF cells. First, each possible output of a PUF cell should have an equal, or substantially equal, probability. For example, if a PUF cell is configured to be used generate a '1' or a '0' depending on random manufacturing variations the PUF cell, there should be an equal, or substantially equal, probability of a '1' or a '0'. If this is not achieved, the output of the PUF apparatus may not be sufficiently random. Achieving this requires a circuit design and layout configuration of each PUF cell, and the PUF apparatus overall, that will not favour any one particular possible output value.

Second, it is preferable for the PUF apparatus to be low cost, in terms of power consumption and/or area used in an integrated circuit (IC) and/or time required to generate the PUF output, so that it can be implemented in devices more easily. For example, PUF apparatus may be particularly useful for Internet of Things (IoT) device security, such as for authenticating the identity of an IoT device and/or securing communications to/from an IoT device. In order to include a PUF apparatus in an IoT device, it is helpful for the PUF apparatus to be cheap and/or low power and/or small.

Third, since the random number generated by the PUF apparatus should be persistent, it is preferable that any PUF cell measurements/readings on which the random number is based are relatively stable and consistent over time. Therefore, it is preferable that any PUF cell characteristics that determine the value of the random number are relatively stable over time and are measured accurately and reliably over time, so that the random number remains the same (or the same within acceptable tolerances, such as the tolerances required for effective error correction coding, ECC).

To address at least some of these challenges, a PUF apparatus is disclosed herein, which comprises a plurality of PUF cells. Each of the PUF cells includes a pair of capacitors, that may be of identical in design, but will inherently have some random manufacturing differences, which should result in some randomness in the differences between their characteristics, for example their capacitances. These random manufacturing differences may be detected for one or more PUF cells by determining a capacitor difference value for each PUF cell, which is indicative of the random differences between the capacitors in the PUF cell. A persistent random number can then be generated as the PUF output based on those one or more capacitor difference values.

Various techniques for determining the capacitor difference value with improved accuracy and repeatability are disclosed. For example, it may be determined by biasing the pair of capacitors with a particular voltage and taking a measurement indicative of the voltage at a common node shared by the capacitors under that bias, then changing the biasing to redistribute the charge and taking a second measurement indicative of the voltage at the common node shared by the capacitors under the changed bias. Each of those measurements is likely to include various components of noise and mismatch/inaccuracy, a number of which should stay substantially the same. Consequently, by taking the difference between the two measurements, it is possible to cancel most of the noise and mismatch/inaccuracy components and therefore obtain a more accurate and reliable measure of the random manufacturing differences. Improving the accuracy and reliability of measurement in this way should result in a more reliably random number with better persistence over time. In a further example, multiple PUF cells may share a common output line and output a voltage or current via a buffer in the PUF cell, which can then be used for measuring the random manufacturing differences. Sharing a common output line should reduce the size and complexity of the apparatus, particularly for very large arrays of PUF cells. Furthermore, by using a buffer in each cell (which may be counter-intuitive as it is likely to increase the size and cost of each PUF cell), they are isolated from parasitic capacitances that might otherwise affect the measurable capacitance of the pairs of capacitors in a way that would be detrimental to the randomness and persistence of the generated PUF outputs.

FIG. 1 shows an example schematic representation of PUF apparatus/system 100 in accordance with an aspect of the present disclosure. The PUF apparatus comprises a plurality of PUF cells $105_{x,y}$, a determination unit 170 and a challenge/response unit 180. Whilst only a 2×2 array of PUF cells $105_{x,y}$ is represented, it will be appreciated that there may be any number of PUF cells, (for example, 8, 12, 20, 32, 128, 256, etc, etc) arranged in an array of any size and dimension, or arranged in any other suitable configuration.

The determination unit 170 is configured to determine a PUF output using the plurality of PUF cells $105_{x,y}$. The PUF output is a persistent random number, which is explained in more detail in the 'background' section of this disclosure.

The challenge/response unit 180 is configured to receive a 'challenge' from an external entity, request and obtain the PUF output from the determination unit 170 and then determine and return a response based on the challenge and the PUF output. The challenge/response unit 180 may be configured to operate in any suitable way that will be apparent to the person skilled in the art of PUF devices. The challenge/response unit 180 may form a separate unit, or may be part of the determination unit 170. The present disclosure is concerned specifically with the configuration and operation of the PUF cells $105_{x,y}$ and determination unit 170, as described in detail below. Therefore, no further reference to, or explanation of, the challenge/response unit 180 is given in this disclosure.

Figure 2A:
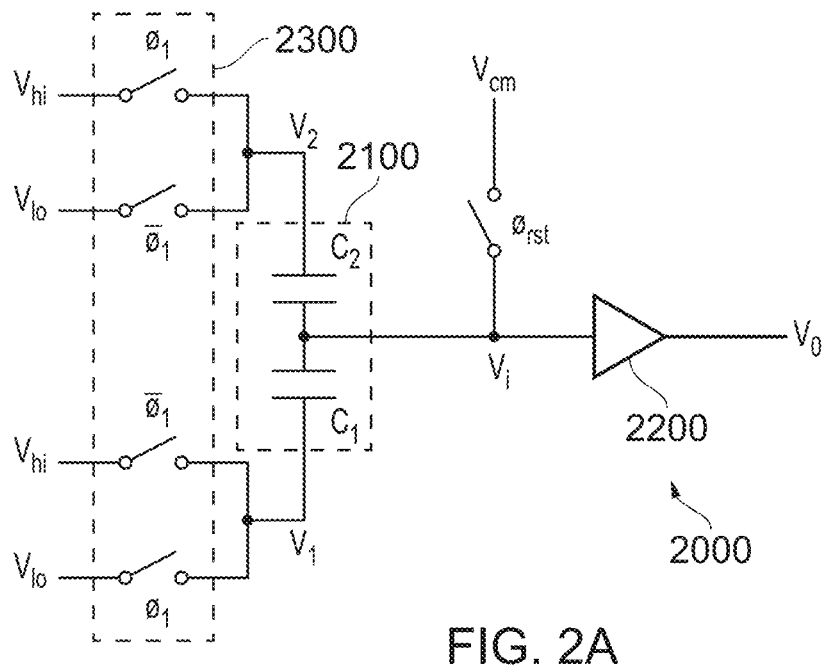
FIG. 2A shows an example schematic diagram of a first circuit for determining a capacitor difference value indicative of a random manufacturing difference between a matched pair of capacitors.

FIG. 2A shows a schematic diagram of a circuit for determining a capacitor difference value indicative of a random manufacturing difference between a pair of capacitors 2100. As will be explained later in this disclosure, each PUF cell $105_{x,y}$ may comprise a pair of capacitors $2100_{x,y}$, such that each PUF cell $105_{x,y}$ may be used to generate a corresponding capacitor difference value, based on which the PUF output can be determined. However, for the sake of simplicity, the determination of a capacitor difference value from a single pair of capacitors 2100 shall first be described, with reference to FIG. 2.

The pair of capacitors 2100 may be a matched pair of capacitors, or they may be different capacitors. The term 'matched' in this disclosure means that the pair of capacitors are of identical design. Whilst the two capacitors making up the matched pair of capacitors 2100 are of identical design, in practice there will inevitably be small, random manufacturing variations between the two capacitors. Those manufacturing variations may include at least one of: differences in distance between the capacitor plates (for example, caused by differences in dielectric thickness), differences in the area of overlap of the two plates, differences in dielectric constant, etc. These manufacturing variations result in variations in capacitance between the two capacitors making up the matched pair of capacitors 2100. Whilst the rest of the disclosure below will focus on a matched pair of capacitors 2100 for simplicity, it should be appreciated that in an alternative the two capacitors 2100 may be of different design. In this case, there will be some expected difference between their capacitances, on top of which random manufacturing differences should introduce some random variation around the expected difference. Consequently, the capacitor difference value that is determined according to the processes described below may perform the same function as when the capacitors are matched, but with an offset applied to the random variation, that offset being equal to the design difference in capacitance of the two capacitors.

The circuit of FIG. 2A comprises a switch bank 2300 that may be used to set bias conditions for determining the capacitor difference value indicative of the random manufacturing difference between the first capacitor $C_1$ and the second capacitor $C_2$. The first capacitor $C_1$ and the second capacitor $C_2$ are arranged as a capacitor divider, wherein the two capacitors share a common node, or centre tap. The circuit further comprises a buffer 2200 for buffering the signal at the common node between the first capacitor $C_1$ and the second capacitor $C_2$. The buffer may be any suitable type of voltage buffer (for example a source follower, a simple opamp, etc) that is configured to output a voltage $V_o$, or current, that is indicative of the voltage $V_i$ at the common node or centre tap of the capacitor divider. Each of the switches in the circuit may be implemented by any suitable type of controllable switch, for example each switch may be implemented by a transistor such as a FET or a bipolar transistor. The state of each switch may be controlled by a controller that is not represented in FIG. 2A for the sake of simplicity.

Figure 2B:
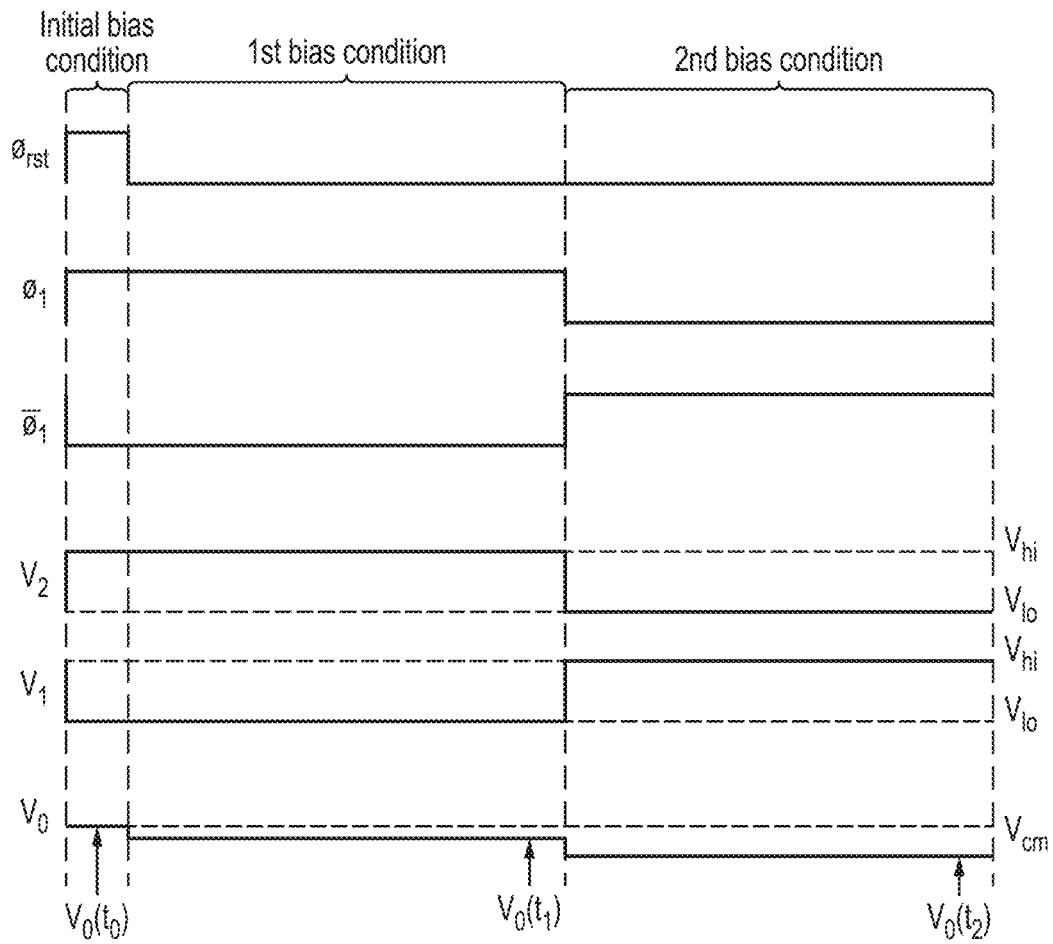
FIG. 2B shows an example timing diagram of the operation of the circuit of FIG. 2A.

FIG. 2B shows an example timing diagram of the operation of the circuit of FIG. 2A. The timing diagram in FIG. 2B represents timings of switch control signals $\varphi 1$, $\overline{\varphi 1}$ and $\varphi_{rst}$, and the relative voltages $V_1$, $V_2$ and $V_o$. Initially, an initial bias condition is set, where $\varphi_{rst}$ closes the reset switch so that a common mode voltage $V_{cm}$ (an initialisation voltage, which may be at any suitable voltage level, for example in consideration of the components in the circuit, such as which buffer 2200 is used, etc) is applied to the common node or centre tap of the two capacitors. During the initial bias condition, the voltage of $V_2$ is held relatively high ($V_{hi}$) and the voltage of $V_1$ is held relatively low ($V_{lo}$). $V_{hi}$ and $V_{lo}$ may be set to any suitable size, for example depending on the size and type of capacitors used. The output voltage at a time to during the initial bias condition may be expressed as:

$$V_o(t_0) = V_{cm} + V_{off} + V_n(t_0)$$

where $V_{off}$ is the offset of readout, caused by any inherent offset in the buffer 2200, and $V_n(t_0)$ is the random readout noise at time to.

A first bias condition is then set by opening the reset switch such that the common node is no longer held at $V_{cm}$. This means that a first bias voltage $V_{hi}$-$V_{lo}$ is applied across the pair of capacitors 2100 without the common node or centre tap being held to any particular potential. The first bias condition thereby sets a corresponding first charge distribution between the two capacitors. In the timing diagram of FIG. 2B, a change in $V_o$ is represented when the bias condition changes from the initial condition to the first condition. This change is a result of charge injection and capacitive coupling of the reset switch. The output voltage at a time $t_1$ during the first bias condition may be expressed as:

$$V_o(t_1)=V_{cm}+V_{off}+V_{ci}+V_{ktc}+V_n(t_1)$$

where $V_{ci}$ is the charge injection from the rst switch caused by the switch opening, $V_n(t_1)$ is the random readout noise at time $t_1$ and $V_{ktc}$ is sampled KTC noise from the two capacitors. The value $V_o(t_1)$ shall be referred to as a first nodal measurement that is indicative of a voltage at the common node of the capacitor divider 2100 during the first bias condition.

A second bias condition is then set by applying the first bias voltage across the pair of capacitors 2100 in the opposite direction, such that the voltage across the pair of capacitors 2100 is $-(V_{hi}-V_{lo})$. This is achieved by controlling the switch bank 2300 to apply $V_{lo}$ to $V_2$ and apply $V_{hi}$ to $V_1$. In the timing diagram of FIG. 2B, a change in $V_o$ can be seen when the bias condition changes from the first condition to the second condition, which is caused by a redistribution of charge between the first capacitor and the second capacitor. $V_o$ is represented as decreasing when the second bias condition is applied, which is a result of the capacitance of $C_2$ being greater than that of $C_1$. If, however, the capacitance of $C_1$ were greater than that of $C_2$, $V_o$ would instead increase when the second bias condition is applied. The output voltage at a time $t_2$ during the second bias condition may be expressed as:

$$V_o(t_2)=V_{cm}+V_{off}+V_{ci}+V_{ktc}+V_n(t_2)+((C_1-C_2)/(C_1+C_2))*(V_{hi}-V_{lo})$$

The value $V_o(t_2)$ shall be referred to as a second nodal measurement that is indicative of a voltage at the common node of the capacitor divider 2100 during the first bias condition.

Because the pair of capacitors are matched, by design their capacitance is $C_1=C_2=C$. However, in practice, there is a small, random difference in their capacitance, such that $C_1-C_2=dC$. Therefore, we can express the actual capacitance of $C_1$ and $C_2$ as:

$$C_1=C+dC/2$$

$$C_2=C-dC/2$$

Substituting this into the equation above, we arrive at:

$$V_o(t_2)=V_{cm}+V_{off}+V_{ci}+V_{ktc}+V_n(t_2)+(dC/2C)*(V_{hi}-V_{lo})$$

Whilst $V_o(t_2)$ is a function of the random manufacturing difference (dC) between the capacitors, it is also affected by a number of different sources of noise. Consequently, $V_o(t_2)$ may not be a reliable indicator of the random manufacturing difference, particularly considering that dC may be very small and therefore susceptible to being lost in noise.

However, by taking the difference of $V_o(t_2)-V_o(t_1)$, we arrive at:

$$V_o(t_2)-V_o(t_1)=(dC/2C)*(V_{hi}-V_{lo})+V_n(t_2)-V_n(t_1)$$

By taking the difference in this way, ktc noise $V_{ktc}$, the offset $V_{off}$, the charge injection signal $V_{ci}$, and the common mode signal, $V_{cm}$, are all cancelled out. Furthermore, any low frequency components in the readout noise $V_n(t_0)$ and $V_n(t_1)$ should also substantially cancel. Therefore, by measuring $V_o$ under both first and second bias conditions and then finding the difference, a more accurate measure of the random manufacturing difference between the two capacitors $C_1$ and $C_2$ can be found. The difference between $V_o(t_2)$ and $V_o(t_1)$ may be referred to as the capacitor difference, that is indicative of a random manufacturing difference between the pair of capacitors 2100. This more accurate measure can then be used to determine a PUF output, for example setting the value of one bit in a multi-bit PUF output.

For example, $V_o(t_2)-V_o(t_1)$ may be used to set the $n^{th}$ bit of the PUF output. If $V_o(t_2)-V_o(t_1)$ is a positive value, this indicates that $C_1>C_2$ and the $n^{th}$ bit may be set to 1 (or 0). If $V_o(t_2)-V_o(t_1)$ is a negative value, this indicates that $C_2>C_1$ and the $n^{th}$ bit may be set to 0 (or 1). As will be appreciated from the description later, each bit of the PUF output may be set by the capacitor difference value determined for a different pair of capacitors. Since the capacitor difference value $V_o(t_2)-V_o(t_1)$ has been determined in a way that maximises the accuracy of measurement of dC by eliminating almost all noise, the value of the PUF output is determined almost exclusively by the random manufacturing difference. This should result in the value of the PUF output being sufficiently random to meet PUF requirements. Furthermore, by minimising the amount of noise present in the capacitor difference value, the persistence of the PUF output should also be improved, since there is a reduced risk of the PUF output changing over time as a result of noise in the capacitor difference value.

Figure 3A:
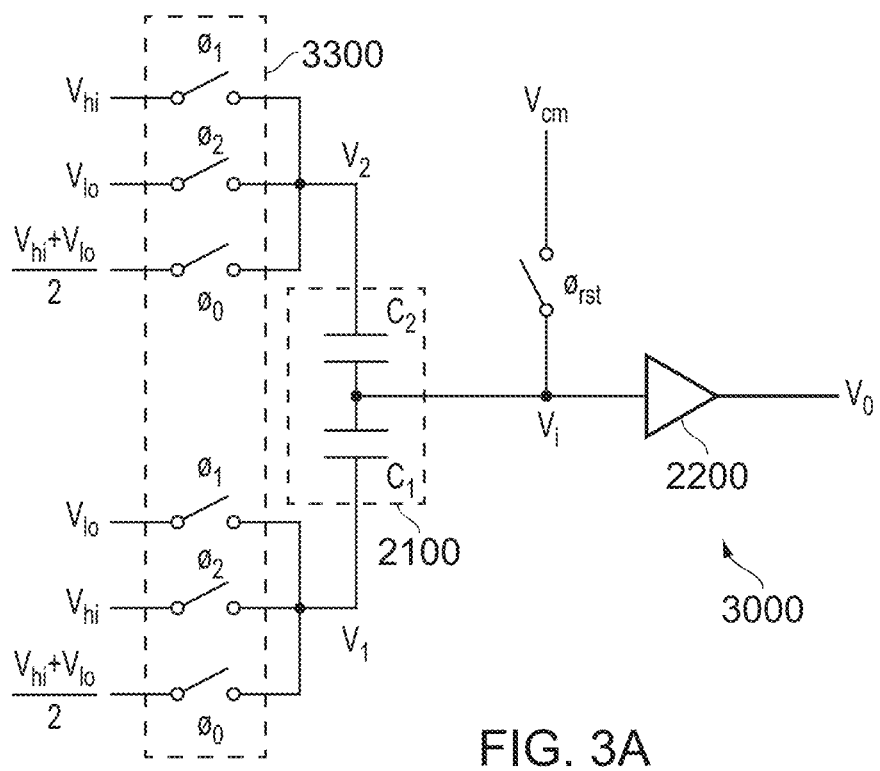
FIG. 3A shows an example schematic diagram of a second circuit for determining a capacitor difference value indicative of a random manufacturing difference between a matched pair of capacitors.

FIG. 3A shows a schematic diagram of an alternative circuit for determining a capacitor difference value for the matched pair of capacitors 2100. This configuration is different from that of FIG. 2A in the configuration and control of the switch bank 330, such that the bias conditions are slightly different.

Figure 3B:
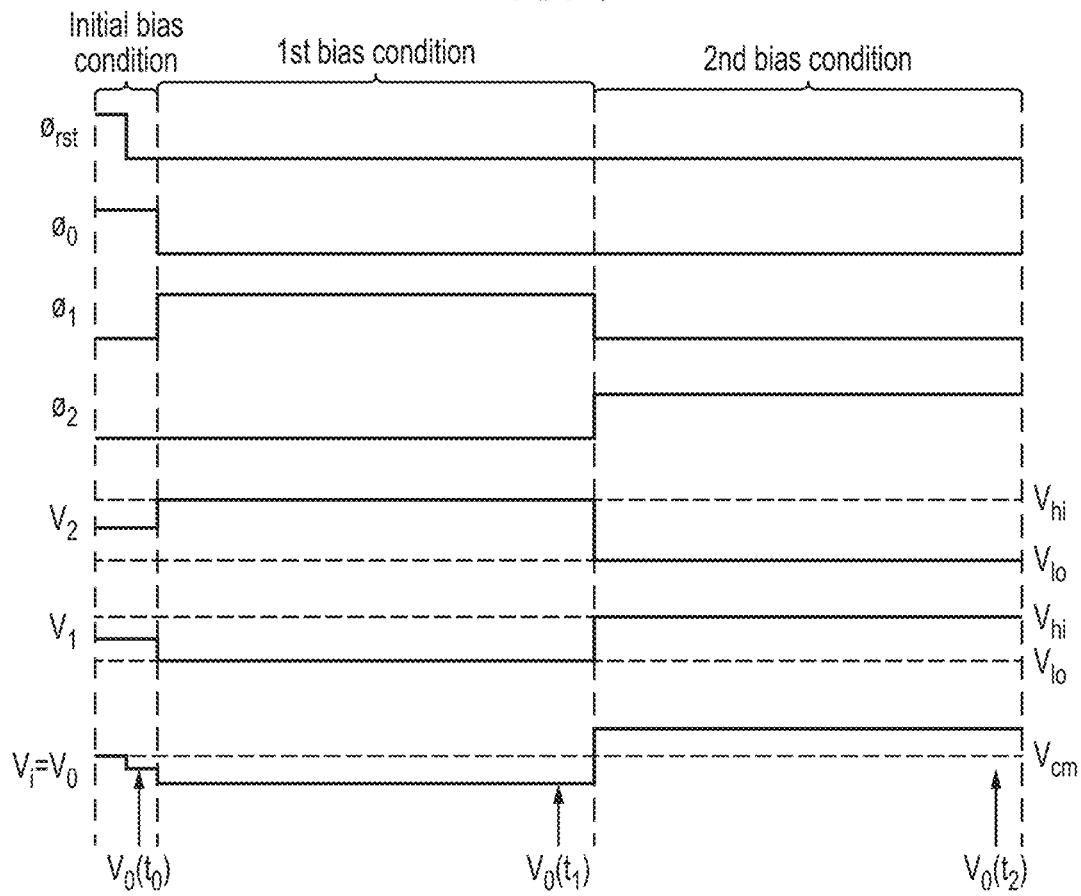
FIG. 3B shows an example timing diagram of the operation of the circuit of FIG. 3A.

FIG. 3B shows an example timing diagram of the operation of the circuit of FIG. 3A. In the initial bias condition, to start with the common mode voltage, $V_{cm}$, (the initialisation voltage) is applied to the common node of the two capacitors as described above with respect to FIG. 2B. However, the switch bank 3300 is controlled to hold both $V_2$ and $V_1$ to the same voltage $(V_{hi}-V_{lo})/2$. The common mode voltage $V_{cm}$ is then removed from the common node by setting control signal ?$_{rst}$ to open the reset switch. The voltage $V_o$ shifts slightly from the common mode voltage $V_{cm}$ (FIG. 3B shows a decrease in $V_o$ after the reset switch opens), which is a result of charge injection and capacitive coupling of the reset switch. At time $t_0$, the output voltage $V_o$ may be expressed as:

$$V_o(t_0)=V_{cm}+V_{off}+V_{ci}+V_{ktc}+V_n(t_0)$$

The switch bank 3300 is then controlled to change the bias condition to the first bias condition, which is the same as described earlier, thereby setting a corresponding first distribution of charge. FIG. 3B shows a resulting reduction in $V_o$, which is a result of the capacitance of $C_1$ being greater than that of $C_2$. If the capacitance of $C_2$ were greater than that of $C_1$, there would instead be an increase in $V_o$ to a value above the level of $V_{cm}$. The output voltage at a time $t_1$ during the first bias condition may be expressed as:

$$V_o(t_1)=V_{cm}+V_{off}+V_{ci}+V_{ktc}+V_n(t_1)-(dC/2C)*(V_{hi}-V_{lo})$$

The switch bank 3300 is then controlled to change the bias condition to the second bias condition, which is the same as described earlier. FIG. 3B shows a resulting increase in $V_o$ to a value above the level of $V_{cm}$, which is a result of the capacitance of $C_1$ being greater than that of $C_2$. If the capacitance of $C_2$ were greater than that of $C_1$, there would instead be a decrease in $V_o$ to a value below the level of $V_{cm}$. The output voltage at a time $t_2$ during the second bias condition may be expressed as:

$$V_o(t_2)=V_{cm}+V_{off}+V_{ci}+V_{ktc}+V_n(t_2)+(dC/2C)*(V_{hi}-V_{lo})$$

As can be seen, as a result of the bias between applied in the opposite direction during the second bias conditions compared with the first, the sign of the $(dC/2C)*(V_{hi}-V_{lo})$ is changed. However, all of the sources of noise/mismatch/inaccuracy are unchanged.

Therefore, capacitor difference value may be determined as:

$$V_o(t_2)-V_o(t_1)=(dC/C)*(V_{hi}-V_{lo})+V_n(t_2)-V_n(t_1)$$

Whilst this would appear to give exactly the same result as the configuration of FIG. 2A, by initially holding both $V_1$ and $V_2$ to the mid-level voltage $(V_{hi}-V_{lo})/2$, there may be improved symmetry of biasing between the pair of capacitors 2100 in that during both the first and second biasing conditions, both $V_1$ and $V_2$ are always different from the initial condition by an amount equal to $\pm(V_{hi}-V_{lo})/2$. This may help to cancel out any non-linear voltage-capacitance relationships/transfer functions in the capacitors $C_1$ and $C_2$, thereby even further improving the accuracy and long-term stability with which the capacitor difference value measures dC.

Figure 4:
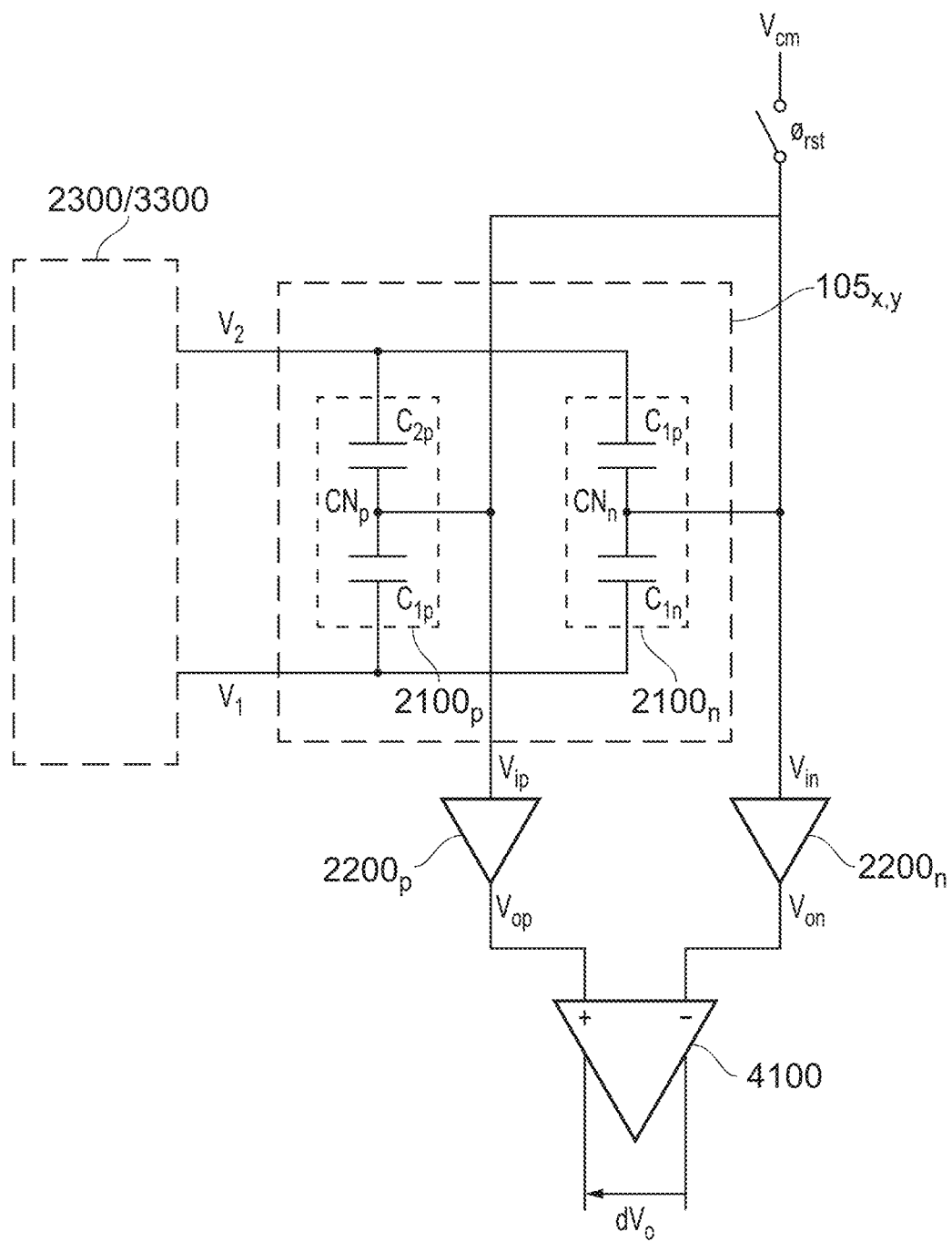
FIG. 4 shows an example schematic diagram of a third circuit for determining a capacitor difference value indicative of a random manufacturing difference between a matched pair of capacitor dividers.

FIG. 4 shows a schematic diagram of a further alternative circuit for determining a PUF value using two pairs of capacitors 2100p and 2100n. The circuit comprises a first buffer 2200p for the first pair of capacitors 2100p and a second buffer 2200n for the second pair of capacitors 2100n. The outputs of the buffers are coupled to the inputs of a differential amplifier 4100, whose output $dV_o$ is indicative of the magnitude of the difference between $V_{op}$ and $V_{on}$. Whilst in FIG. 4 the two buffers 2200$_p$ and 2200$_n$ are represented as being outside of the cell 105$_{x,y}$, in an alternative each cell 105$_{x,y}$ may include the buffers 2200$_p$ and 2200$_n$. The circuit may comprise either switch bank 2300 or switch bank 3300, such that the circuit may be driven with the bias conditions described above with respect to FIG. 2B or FIG. 3B.

The outputs $V_{op}$ and $V_{on}$ during the different bias conditions may each behave in the same way as $V_o$ described above with respect to FIGS. 2 and 3. By design the capacitances of the capacitors may be $C_{1p}=C_{1n}=C_{2p}=C_{2n}=C$. However, in practice, there is likely to be a small, random difference in their capacitances, such that $C_{1p}-C_{2p}=dC_p$ and $C_{1n}-C_{2n}=dC_n$.

The following equations are based on using the switch bank 3300 to set the bias conditions as described with reference to FIG. 3B. However, it will be appreciated that equivalent equations would equally apply for the case where switch bank 2300 is used to set the bias conditions of FIG. 2B.

At time $t_0$, the output $dV_o(t_0)$ may be expressed as:

$$dV_o(t_0)=V_{op}(t_0)-V_{on}(t_0)$$

where the equation for $V_o(t_0)$ described above with respect to FIG. 3B applies to both $V_{op}(t_0)$ and $V_{on}(t_0)$.

At time $t_1$, the output $dV_o(t_1)$ may be expressed as:

$$dV_o(t_1)=V_{op}(t_1)-V_{on}(t_1)$$

where the equation for $V_o(t_1)$ described above with respect to FIG. 3B applies to both $V_{op}(t_1)$ and $V_{on}(t_1)$.

At time $t_2$, the output $dV_o(t_2)$ may be expressed as:

$$dV_o(t_2)=V_{op}(t_2)-V_{on}(t_2)$$

where the equation for $V_o(t_2)$ described above with respect to FIG. 3B applies to both $V_{op}(t_2)$ and $V_{on}(t_2)$.

The capacitor difference value may therefore be determined from $dV_o(t_2)-dV_o(t_1)$.

A benefit of this approach of considering the difference between $V_o$ from two pairs of capacitors is that any systematic, correlated errors between $C_1$ and $C_2$ may be cancelled out. For example, as a result of some aspect of the manufacturing process, there may be a gradient in the gate oxide thickness that results in the oxide of $C_1$ being thicker than that of $C_2$ with a probably greater than 0.5. This may reduce the randomness of the PUF value determined from the capacitor difference value. However, the approach described above should cancel any systematic, correlated differences between $C_1$ and $C_2$ (i.e., the correlated parts of $dC_n$ and $dC_p$), such that only the uncorrelated, random parts of $dC_n$ (the difference between $C_{1n}$ and $C_{2n}$) and $dC_p$ (the difference between $C_{1p}$ and $C_{2p}$) remain in the capacitor difference value. Thus, the randomness of the PUF output should be improved.

Figure 5:
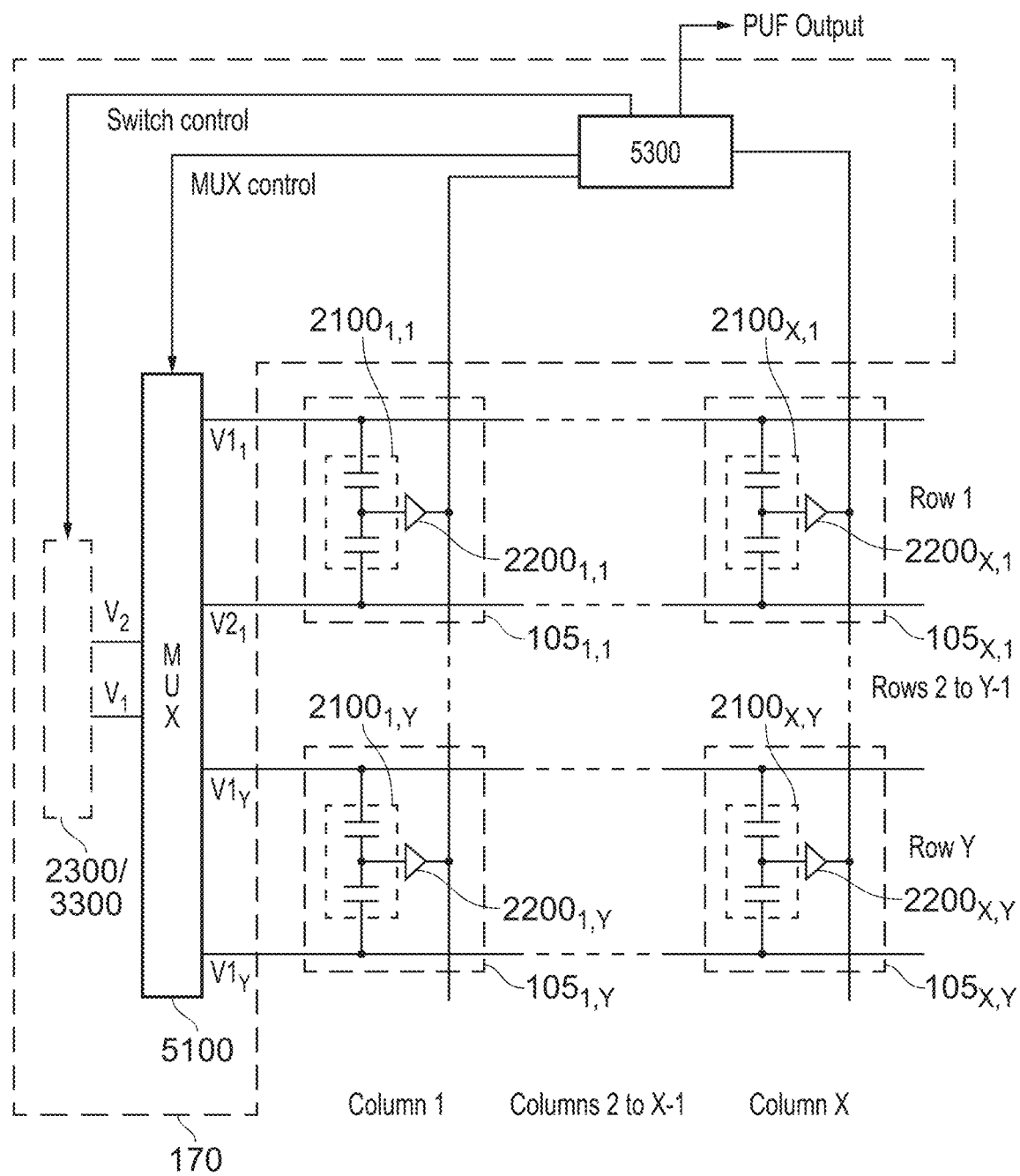
FIG. 5 shows an example schematic diagram showing details of one implementation of the PUF apparatus of FIG. 1.

FIG. 5 shows an example representation of details of the PUF apparatus 100. In this example, a plurality of PUF cells 105$_{x,y}$ are represented, where x=1, 2, . . . X−1, X and y=1, 2, . . . Y−1, Y, such that the overall number of PUF cells 105$_{x,y}$ totals X*Y. The PUF cells 105$_{x,y}$ in this example are arranged in an array comprising X columns and Y rows. Each PUF cell 105$_{x,y}$ comprises a pair of capacitors 2100$_{x,y}$ and a corresponding buffer 2200$_{x,y}$. The determination unit 170 comprises a MUX 5100 that is used for distributing the signals received from the switch bank 2300/3300 in order to set the potentials at $V_1$ and $V_2$ for each PUF cell 105$_{x,y}$ so as to determine a capacitor difference value for each PUF cell 105$_{x,y}$. The MUX 5100 may also distribute the control signal ⌷$_{rst}$ in order to control the initialisation bias condition, although this is not represented in FIG. 5 for the sake of simplicity. The MUX may apply the $V_1$ and $V_2$ signals received from the switch bank 2300/3300 to a particular row of PUF cells 105$_{x,y}$ in order to drive the PUF cells 105$_{x,y}$ in that row. The signal lines $V_1$ and $V_2$ for all other rows of PUF cells 105$_{x,y}$ may be held at 0V, so as not to drive those cells.

The determination unit 170 further comprises a PUF output unit 5300 that is configured to control the operation of the switch bank 2300/330 and the MUX 5100 in order to set the voltage levels for $V_1$ and $V_2$ of the PUF cells 105$_{x,y}$, in accordance with the operation described earlier. Each column of cells shares a common output line, such that there are X output lines in total. However, the inventors realised that using a common output line in this way may result in cells suffering from parasitic capacitances that may cause a loss of signal (for example, by virtue is reduced SNR) and potentially result in a systematic skew that moves the probability of $C_1$ being larger than $C_2$ away from 0.5. To address this issue, each cell includes a buffer 2200$_{x,y}$, which makes it is possible to couple all of the cells in a column to the same common output line and still shield those cells from parasitic capacitances. Therefore, whilst the inclusion of the buffers 2200$_{x,y}$ may be counter intuitive in that it increases the size of each cell 105$_{x,y}$, it enables a simplified connections between the cells and the PUF output unit 5300 by reducing the number of required output lines (which may be particularly beneficial for large arrays), whilst still preserving the accuracy of the determined capacitor difference values. Optionally, the buffers 2200$_{x,y}$ may have some gain, in which case they may be seen as amplifiers performing both buffering and gain functions. The buffers/amplifiers 2200$_{x,y}$ may be configured to output either a voltage based on the input voltage, or a current based on the input voltage.

The PUF output unit 5300 is coupled to the common output lines and during its control of the switch bank 2300/3300, stores (for example, by latching or storing in memory) the signals $V_o(t_1)_x$ and $V_o(t_2)_x$ received via the X common output lines. Consequently, a particular row may be selected by controlling the MUX 5100 and the PUF output unit 5300 may determine a capacitor difference value for each PUF cell 105$_{x,y}$ in that selected row in parallel.

Once the capacitor difference values for a selected row have been determined, the PUF output unit 5300 may control the MUX 5100 to select a different row of cells and then control the switch bank 2300/3300 to set the bias conditions described earlier for that selected row, so that capacitor difference values may be determined for the cells in that row.

A PUF output is then determined by the PUF output unit 5300 based on the determined capacitor difference values. For example, the PUF output may be a multi-bit number, where the value of each bit (i.e., either "0" or "1") is set by the capacitor difference value of a different PUF cell 105$_{x,y}$. For example, if the capacitor difference value determined for a particular PUF cell 105$_{x,y}$ is indicative of the a difference between the capacitance of $C_1$ and $C_2$ being greater than expected (for example, the capacitance of $C_1$ is greater than $C_2$ for matched capacitors), the corresponding bit in the PUF output may be set to 1 (or 0). If it is indicative of the capacitance of the difference between $C_1$ and $C_2$ being less than expected (for example, the capacitance of $C_1$ is less than $C_2$ for matched capacitors), the corresponding bit in the PUF output may be set to 0 (or 1). Since the outcome of each cell comparison is dependent on random manufacturing differences between the matched pairs of capacitors 2100$_{x,y}$, it can be seen that the PUF output should be random, in that each different instance of PUF apparatus 100 is highly likely to generate a randomly different PUF output. Furthermore, the outcome of each capacitor comparison should generally stay the same over time (since the noise components in the capacitor readout value have been minimised) or stay the same to within acceptable limits (for example, a change for a small number of PUF cells 105$_{x,y}$ may be acceptable, since it may be possible for ECC to correct for those changes), such that the PUF output is persistent.

By determining the capacitor difference values using parallel processing, a large number of capacitor difference values may be determined in a relatively short period of time. Thus, a relatively large PUF output value, for example 128-bit or 256-bit, may be determined relatively quickly. Furthermore, the entire array of PUF cells 105$_{x,y}$ may share a single switch bank 2300/3300 and set of voltages $V_{hi}$, $V_{lo}$ and $V_{cm}$, thereby reducing component costs and physical size of the PUF apparatus 100.

The configurations of the PUF cells 105$_{x,y}$ represented in FIG. 5 correspond with the arrangements described above with respect to FIGS. 2 and 3. However, in an alternative each PUF cell 105$_{x,y}$ may comprise two pairs of capacitors 2100$_n$ and 2100$_p$ as well as two corresponding buffers 2200$_n$ and 2200$_p$. In this case, each PUF cell 105$_{x,y}$ may have two outputs $V_{op}$ and $V_{on}$, such that each column of cells share two common output lines, one for $V_{op}$ and one for $V_{on}$. Each pair of common output lines may be coupled to a comparator 4100$_x$, such that the determination unit 170 comprises X comparators 4100. The outputs of the comparators 4100$_x$ may be coupled to the PUF output unit 5300, such that the capacitor difference values may be determined in accordance with the process described with reference to FIG. 4.

Figure 6A:
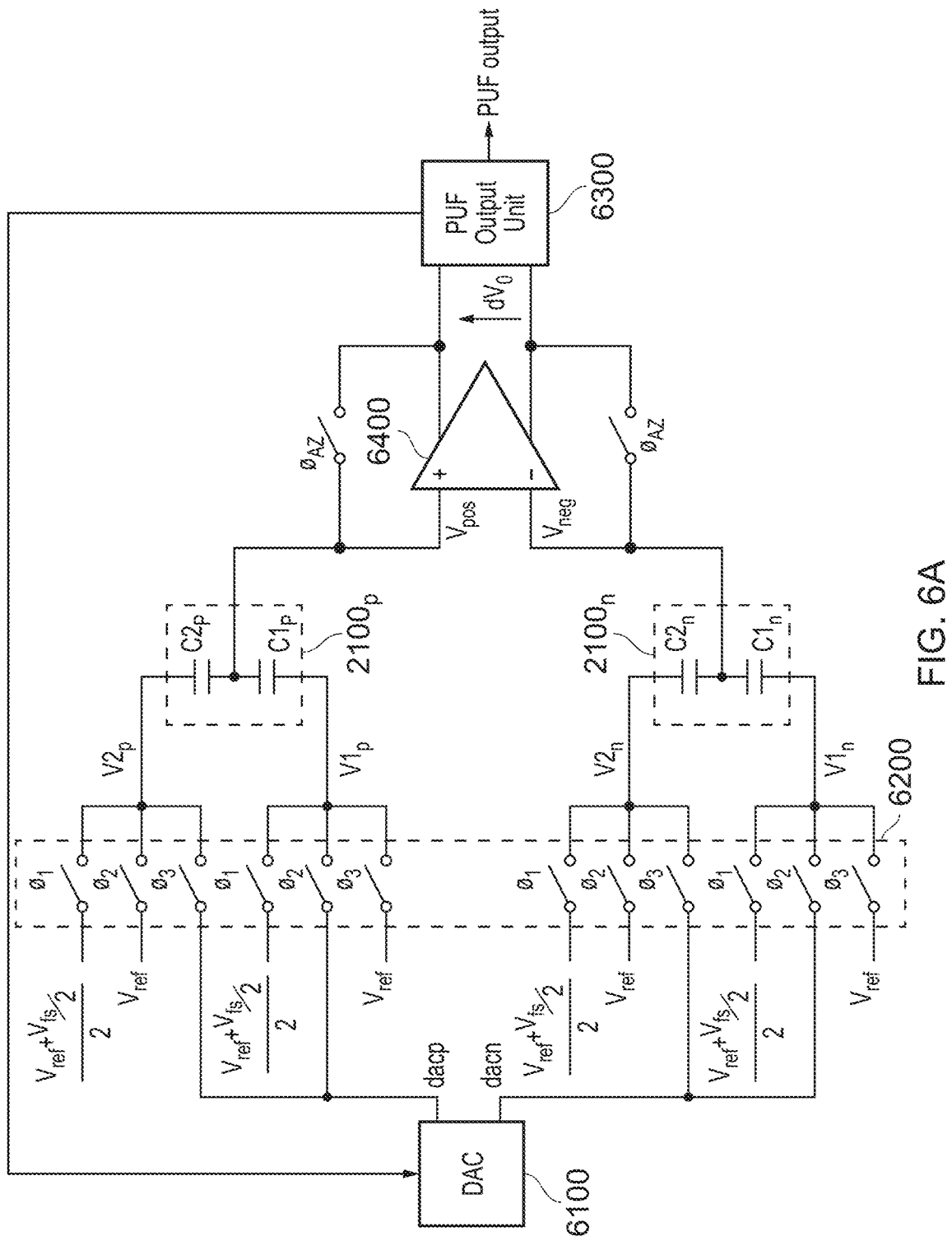
FIG. 6A shows an example schematic diagram of a fourth circuit for determining a capacitor difference value indicative of a random manufacturing difference between a matched pair of capacitor dividers.

FIG. 6A shows a schematic diagram of a further alternative circuit for determining a PUF value using two pairs of capacitors 2100$p$ and 2100$n$. The circuit comprises a switch bank 6200 for use in setting the bias conditions for the pairs of capacitors. The circuit also comprises a DAC 6100, that is controllable by a PUF output unit 6300, and a differential pre-amplifier (or comparator) 6400 whose positive input is coupled to the common node of the first pair of capacitors 2100$p$ and whose negative input is coupled to the common node of the second pair of capacitors 2100$n$. It will be appreciated that in this example the differential pre-amp 6400 effectively comprises one or more buffers, such that one or more buffers form part of the differential pre-amp 6400. The circuit also comprises auto-zero switches to control feedback coupling of the differential preamp 6400. Switch control signals $\phi_1$, $\phi_2$, $\phi_3$ and $\phi_{AZ}$ may all be controlled by the PUF output unit 6300.

As will be appreciated from the description below, the DAC 6100, PUF output unit 6300 and differential preamp 6400 are configured to operate together as a slope converter ADC in order to determine a capacitor difference value for the capacitors $C_1$ and $C_2$.

Figure 6B:
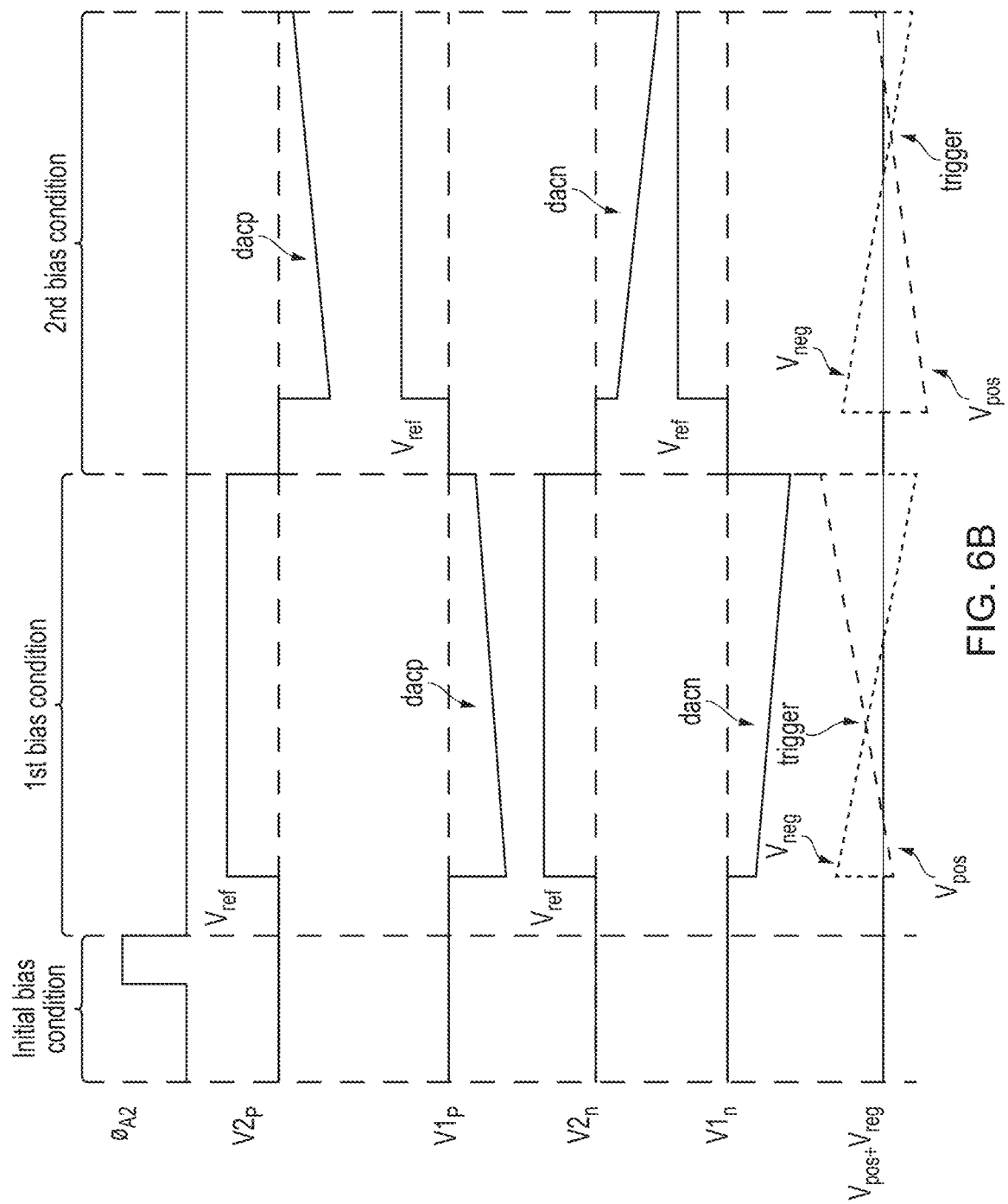
FIG. 6B shows an example timing diagram of the operation of the circuit of FIG. 6A.

FIG. 6B shows a schematic diagram representing the operation of the circuit. The operation of the circuit is very similar to that described above with respect to FIGS. 3 and 4, with the main difference being the nature of the potential to which $V_{2p}$, $V_{1p}$, $V_{2n}$ and yin are held during the first and second bias conditions.

During the initial bias condition, the centre taps or common nodes of the pairs of capacitors 2100$p$ and 2100$n$ are initialised by auto-zeroing, which is controlled by closing the auto-zero switches. The control signal $\phi_1$ is set so as to close its respective switches, thereby holding $V_{2p}$, $V_{1p}$, $V_{2n}$ and yin at $(V_{ref}-V_{fs})/2$, whilst control signals $\phi_2$ and $\phi_3$ are held so their respective switches are open. $V_{fs}$ is the full scale voltage of the DAC 6100. At the end of the initial bias condition, the auto-zero switches are opened, so as to decouple the feedback of the comparator 6400.

During the first bias condition, the switch bank 6200 is controlled to apply $V_{ref}$ to $V2_p$ and $V2_n$, and apply the time-varying voltage signal dacp to $V1_p$ and the time-varying voltage signal dacn to $V1_n$. $V_{ref}$ may be any suitable potential, and is equivalent to $V_{hi}$ described earlier. The signal dacp is an increasing ramp signal output from the DAC 6100, which starts from ground (in this particular example implementation, although it may alternatively start form any other suitable voltage) and increases to the full scale voltage, $V_{fs}$, of the DAC 6100. The signal dacn is a decreasing ramp signal output from the DAC 6100, whose ramp starts at the full scale voltage, $V_{fs}$, of the DAC 6100 and ends at ground (in this particular example implementation, although it may alternatively end at any other suitable voltage). As can be seen from the bottom trace in FIG. 6, when the status of the switch bank 6200 is changed during the first bias condition, the voltage at $V_{neg}$ makes a step increase and then ramps down at a rate determined by dacn. Similarly, the voltage at $V_{pos}$ makes a step decrease and then ramps up at a rate determined by dacp. As can be seen, at a time during the first bias condition (labelled 'trigger' in FIG. 6B), $V_{pos}$ and $V_{neg}$ will cross over, causing the sign of $dV_o$ of the differential preamp to change.

The PUF output unit 6300 may comprise one or more counters whose incrementing and/or decrementing digital output is input into the DAC 6100 for use by the DAC 6100 to generate its ramp signals dacn and dacp. The PUF output unit 6300 may be configured to latch its counter value at the time that the sign of $dV_o$ changes (i.e., at the moment of 'trigger'). The moment at which $V_{neg}$ and $V_{pos}$ cross is a first nodal measurement, indicative of the voltages at the common nodes of the two pairs of capacitors 2100$_p$ and 2100$_n$ being equal During the second bias condition, the switch bank 6200 is controlled to apply $V_{ref}$ to $V1_p$ and $V1_n$, and apply the time-varying voltage signal dacp to $V2_p$ and the time-varying voltage signal dacn to $V2_n$. Thus, the bias applied across the pairs of capacitors during the second bias condition is the same bias voltage that was applied during the first bias condition, but in the opposite direction.

In this example, we have assumed that the actual capacitance of $C2_n$ and $C1_n$ are identical and, as a result, the behaviour of $V_{neg}$ during the second bias condition is the same as the behaviour of $V_{neg}$ during the first bias condition. However, in this example the actual capacitance of $C2_p$ is greater than that of $C1_p$. As a result, when the status of the switch bank is changed during the second bias condition, the voltage at $V_{pos}$ makes a larger step decrease than it did during the first bias condition, and then ramps up at a rate determined by dacp. Consequently, $V_{pos}$ and $V_{neg}$ will cross over during the second bias condition at a different counter value to during the first bias condition. The moment at which $V_{neg}$ and $V_{pos}$ cross during the second bias condition is a second nodal measurement, and is indicative of the voltages at the common nodes of the two pairs of capacitors $2100_p$ and $2100_n$ being equal. If the capacitances of $C_1$ and $C_2$ were identical, the first nodal measurement and the second nodal measurement would be identical. Any difference between the first nodal measurement and the second nodal measurement is indicative of a random manufacturing difference between the two capacitors $C_1$ and $C_2$.

By setting the first bias voltage and second bias voltages in this way (in particular, by setting the voltage applied across the first pair of capacitors $2100_p$ to be the same during the first and second bias conditions, just in the opposite direction, and likewise with the second pair of capacitors $2100_n$), the first and second nodal measurements should have many of the same noise components, such as ktc noise, charge injection and offset. Therefore, by finding the difference between the first and second nodal measurements, those noise components should cancel. Furthermore, similarly to the configuration of FIG. 4, systematic errors between $C_1$ and $C_2$ should also be cancelled out, such as comparator delay. Consequently, by setting the capacitor difference value to be the difference between the first and second nodal measurements, a more accurate and reliable measure of random manufacturing differences between $C_1$ and $C_2$ may be achieved.

It will be appreciated that this configuration may be used as part of a PUF array, where each PUF cell $105_{x,y}$ comprises two pairs of capacitors $2100p$ and $2100n$ and a differential preamp 6400. Similarly to the above description relating to FIG. 5, an entire row of cells may be selected and measured at the same time using the switch bank 6200 and a MUX and the common column output lines.

Whilst the above description includes the pairs of capacitors $2100p$ and $2100n$ as part of a slope-converter to determine dC, in an alternative the same arrangement may instead be driven as an SAR converter, for example by changing the control applied to the DAC 6100 by the PUF output unit 6300. Whilst SAR conversion is typically quicker, this arrangement may have the drawback of requiring a separate DAC for each PUF cell in the selected row, which may increase costs and physical size, or may require only a single PUF cell to be selected and read at any one time, thereby increasing overall time to generate the PUF output.

Figure 12:
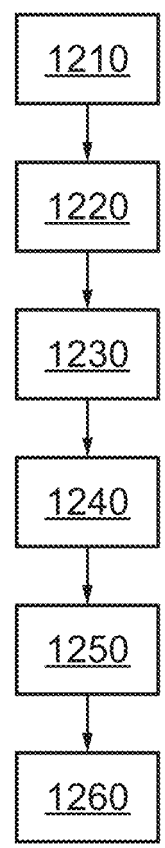
FIG. 12 shows an example flow diagram of steps for determine a PUF output.

FIG. 12 shows an example flow diagram of steps that may be performed in order to determine a PUF output using any of the above described circuits. In step 1210, an initialisation voltage may be applied to the common node of the capacitor divider to set the charge held by the first capacitor and second capacitor. In step 1220, a first bias condition is set across the at least one capacitor divider. In step 1230, a first nodal measurement is determined that is indicative of a voltage at the common node of the at least one capacitor divider during the first bias condition. In step 1240, a second bias condition is across the at least one capacitor divider to change a distribution of charge held by the first capacitor and the second capacitor. In step 1250, a second nodal measurement is determined that is indicative of a voltage at the common node of the at least one capacitor divider during the second bias condition. In step 1260, the PUF output is determined based at least in part on a difference between the first measurement and the second measurement.

It can be seen from the above that various different circuits and techniques are disclosed for determining a capacitor difference value indicative of the random manufacturing differences between pairs of matched capacitors in order to determine a PUF output. Typically, the capacitor difference value is determined by applying a bias voltage across the pair of capacitors (whether fixed or time varying, as is the case for FIGS. 6A and 6B) and then applying the same voltage across the capacitors in the opposite direction (i.e., reversing the first bias voltage) and observing the resultant change in the distribution of charge between the pair of capacitors. By setting these two bias conditions and measuring an effect of the change in charge distribution caused by switching from one condition to the other, a more accurate and reliable measure of the random manufacturing difference between the matched capacitors may be achieved. Furthermore, applying a bias voltage across the part of capacitors, taking a sample ($V_{o(t1)}$), applying the same voltage in reverse and then taking a further sample ($V_{o(t2)}$) to compare to the first sample means that the same common mode should be maintained for both samples. This should reduce or eliminate other sources of noise that might otherwise have an effect on accuracy, such as parasitic capacitance on the common node(s) and/or comparator offset sensitivity to common mode voltage.

Figure 7:
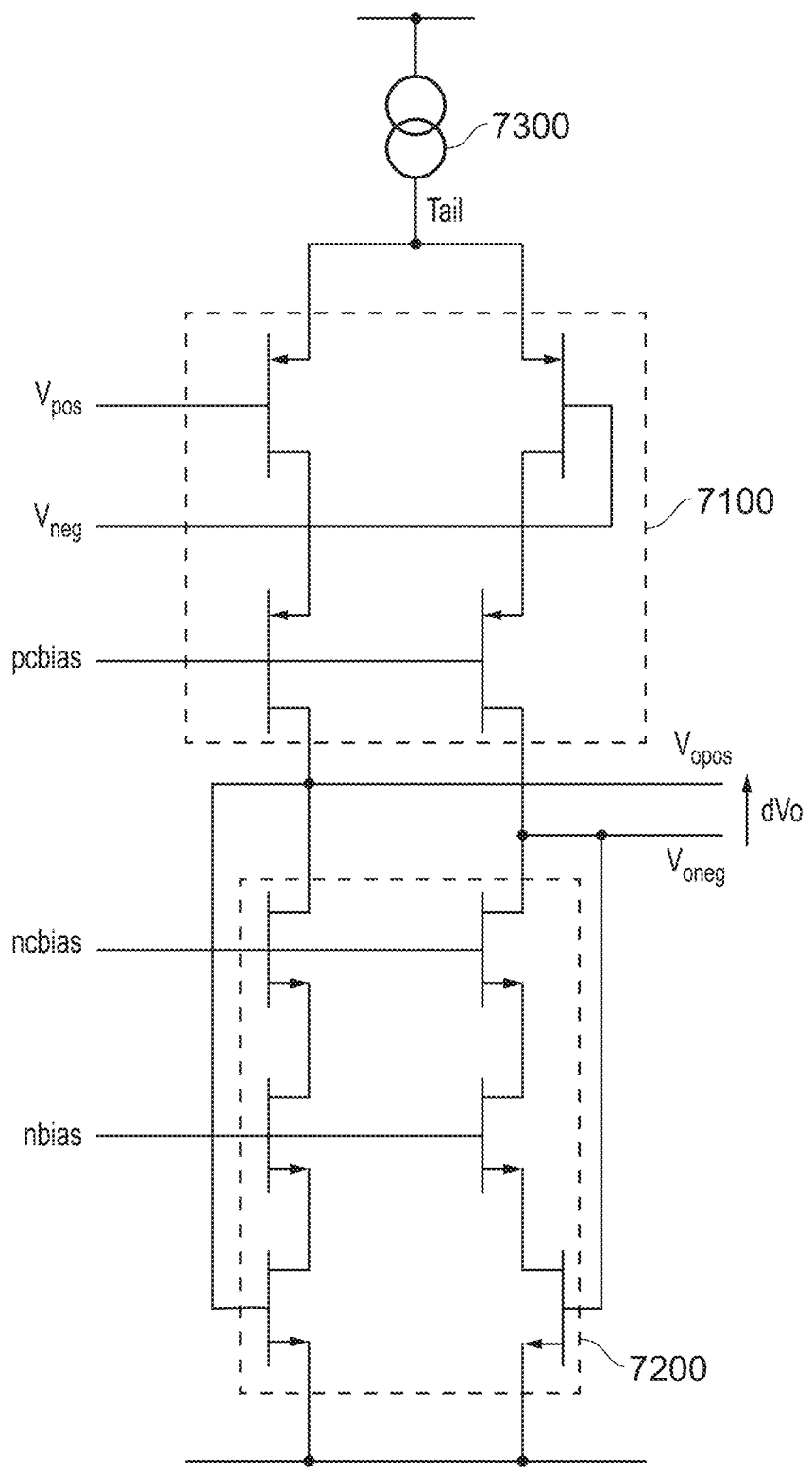
FIG. 7 shows an example schematic diagram of an implementation of the differential preamplifier of FIG. 6A.

FIG. 7 shows an example schematic diagram of how the differential preamp 6400 may be implemented. The preamp 6400 comprises front end transistors 7100, back end transistors 7200 and a current source 7300. The inventors have realised that when the circuit of FIG. 6 is implemented in the context of a PUF cell array, each PUF cell $105_{x,y}$ may include only the front end transistors 7100, with the back end transistors 7200 and current source 7300 being part of the determination unit 170 and shared between a column of cells. The front end transistors 7200 effectively function as buffers, thereby performing the parasitic isolation described earlier in respect of FIG. 5. Furthermore, only having the front end transistors 7100 in the cells means that the size of each cell may be reduced, thereby reducing the overall size of a PUF cell array by increasing packing density. Furthermore, it also means that more components may be shared between PUF cells, thereby reducing the cost of the PUF apparatus and the power consumption.

Figure 8:
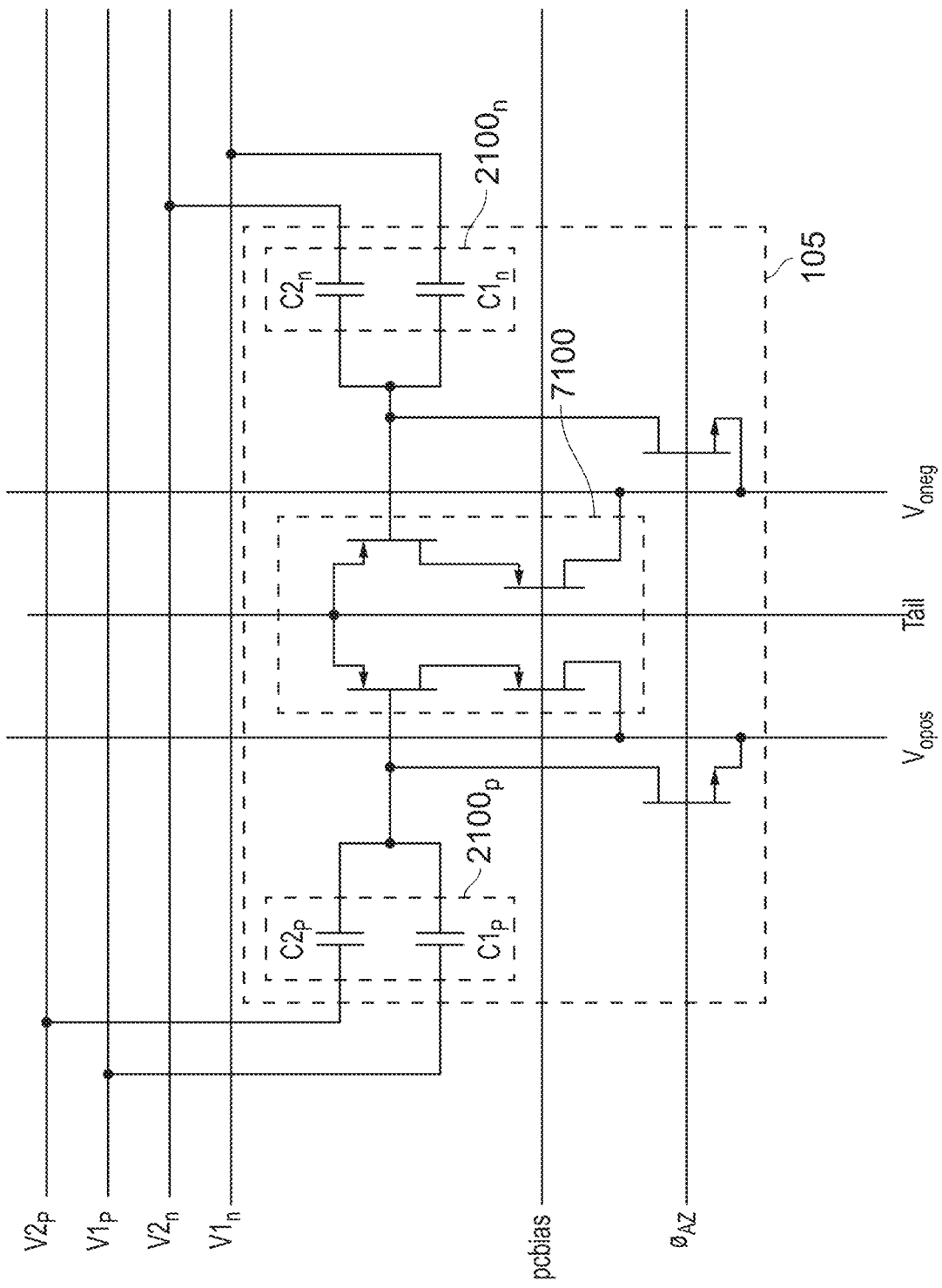
FIG. 8 shows an example schematic diagram of a PUF cell 105 that is configured with two pairs of capacitors and front end transistors for the differential preamplifier of FIG. 6A.

FIG. 8 shows details of an example PUF cell 105 that is configured with the pairs of capacitors $2100p$ and $2100n$ and the front end transistors 7100. The PUF cell also includes auto-zero switches controlled by the control signal $\phi_{AZ}$.

Figure 9:
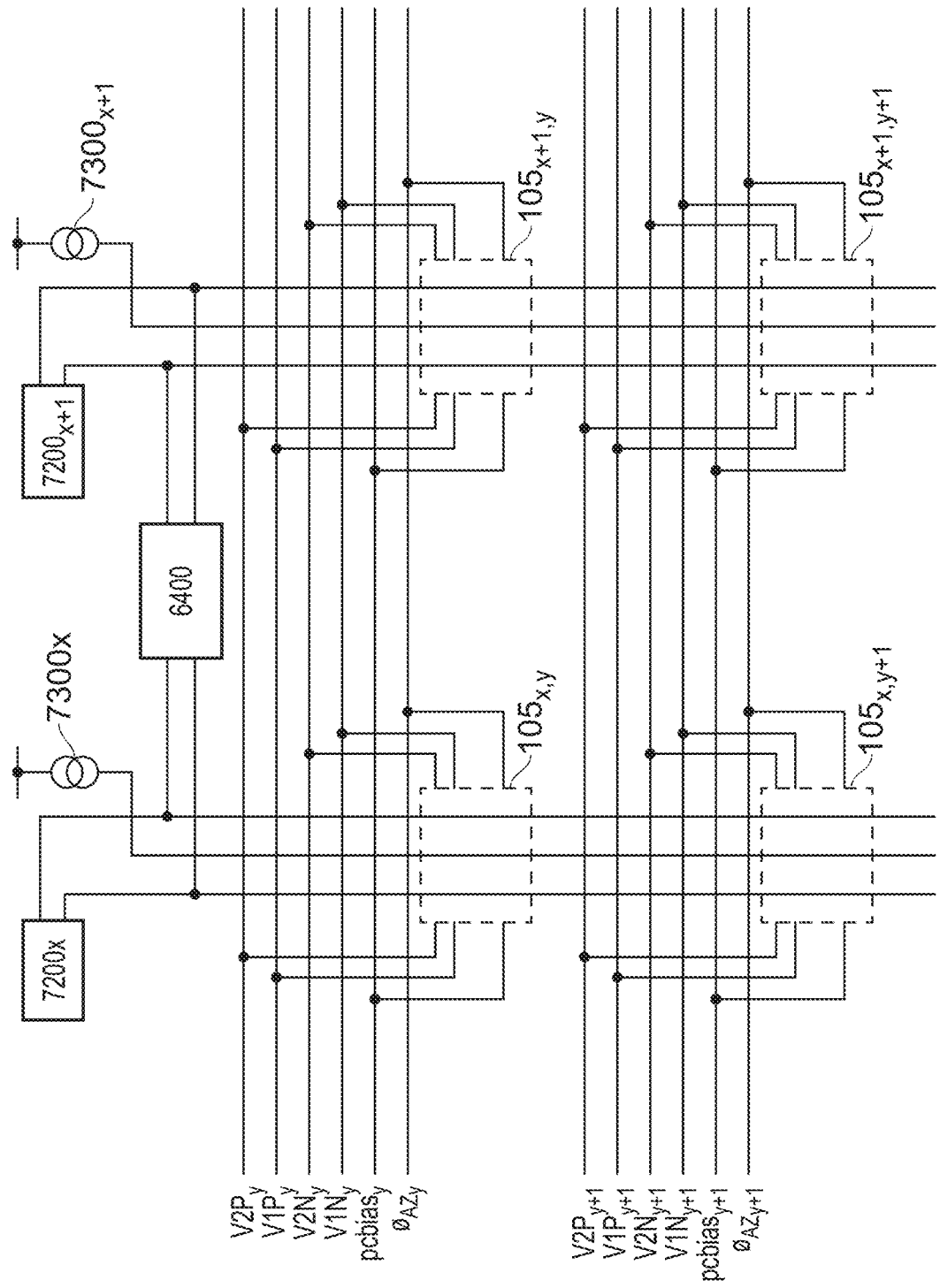
FIG. 9 shows an example schematic diagram of four of the PUF cells of FIG. 8 arranged in an array.

FIG. 9 shows a representation of an example four cells $105_{x,y}$, $105_{x+1,y}$, $105_{x,y+1}$ and $105_{x+1,y+1}$ in an array of PUF cells. Each column of cells has three common lines—one line coupled to the current source $7300_x$ and two common output lines to couple to the differential outputs $V_{opos}$ and $V_{oneg}$ from the front end transistors $7100_{x,y}$ to the PUF output unit 6400 and the back end transistors $7200_x$. A particular row of PUF cells, for example row y, may be selected and measured by controlling (for example, using a MUX 5100, switch bank 6200 and DAC 6100) the potential of the lines $V2P_y$, $V1P_y$, $V2N_y$, $V1N_y$, $pcbias_y$ and $\phi_{AZy}$ as described earlier with respect to FIGS. 6A and 6B. The potentials of those lines for all other rows (for example, $V2P_{y+1}$, $V1P_{y+1}$, $V2N_{y+1}$, $V1N_{y+1}$, $pcbias_{y+1}$ and $\phi_{AZy+1}$ for row y+1) may be held at any suitable potential, such as 0V or Vdd, to deselect those rows.

Figure 10:
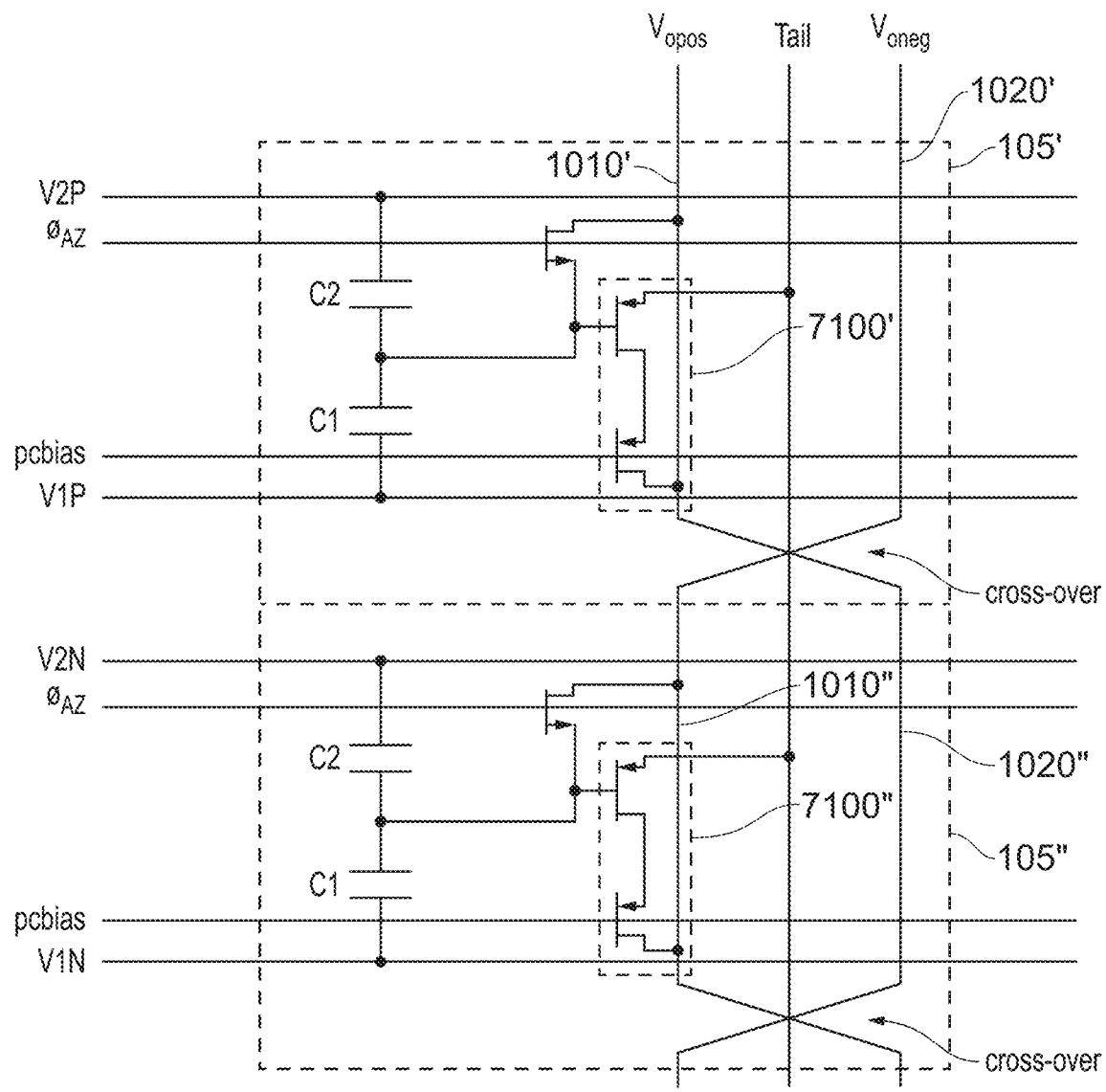
FIG. 10 shows an example schematic diagram of the PUF cell of FIG. 8 implemented by two identical sub-cells.

FIG. 10 shows how the PUF cell 105 may be implemented as a first PUF sub-cell 105' and a second PUF sub-cell 105" that are identical in design. The two sub-cells each have a first output line 1010' and 1010" and a second output line 1020' and 1020" running through them, which in the representation of FIG. 10 are the left most and right most vertical lines respectively. The central vertical line is for the tail current from the current source 7300. The first output line 1010' and 1010" is coupled to the front end transistors 7100' and 7100" respectively. An input terminal to the front end transistors 7100' and 7100" are coupled to the common node of their respective pair of capacitors $C_1$ and $C_2$. An output terminal of front end transistors 7100' and 7100" are coupled to the first output line 1010' and 1010" of their respective sub cell 105' and 105". However, the positions of the first and second output lines in each sub-cell switch over at a cross over part of the cell. This means that when the two sub-cells are positioned adjacent each other, the first output line 1010' of the first PUF sub-cell 105' is coupled to the second output line 1020" of the second PUF sub-cell 105" and the second output line 1020' of the first sub-cell 105" is coupled to the first output line 1010" of the second sub-cell 105". Thus, the signal $V_{opos}$ may be extracted from the first output line 1010' of the first sub-cell 105' and the signal $V_{oneg}$ may be extracted from the second output line 1020' of the first sub cell 105'.

Consequently, it can be seen that when the two sub-cells are coupled in this way, the front end transistors 7100' can form the front-end input for one input of the differential preamp 6400 (eg, the pos input) and the front end transistors 7100" can form the front-end input transistors of the other input of the differential preamp 6400 (eg, the neg input), with both cells still being of identical design. By dividing each PUF cell into two identical sub-cells that are coupled together in this way, the transistors 7100' and 7100" can together form the differential input of the differential preamp 6400 and the sub-cells can be made very consistently and repeatably, thereby improving the consistency of manufacture of each PUF cell which should reduce the risk of any systematic mismatch between the two capacitors $C_1$ and $C_2$. Furthermore, there is inherent matching between the $V_{opos}$ and the $V_{oneg}$ signals carried in the two output lines as a result of the cross-over of the two output lines. Furthermore, by crossing-over of the position of the first and second output lines in each sub-cell, two adjacent sub-cells can be coupled together very straightforwardly without requiring complex interconnections. Furthermore, multiple cells in a column may be formed by simply repeating this coupling, such that all cells in a column can be coupled together very easily, all sharing the same $V_{opos}$, $V_{oneg}$ and Tail lines (for example, sub-cell 105' of one cell in a column may be adjacent to sub-cell 105" of the cell above it, with the $V_{opos}$, $V_{oneg}$ and Tail in the two adjacent sub-cells coupled together). This may improve simplicity of implementation and minimise space required for wiring.

Whilst FIG. 10 shows one particular example design of the layout of identical sub-cells, it will be appreciated that the identical sub-cells may be designed in any other suitable way that results in them being of identical design and couplable together to form a cell.

Figure 11A:
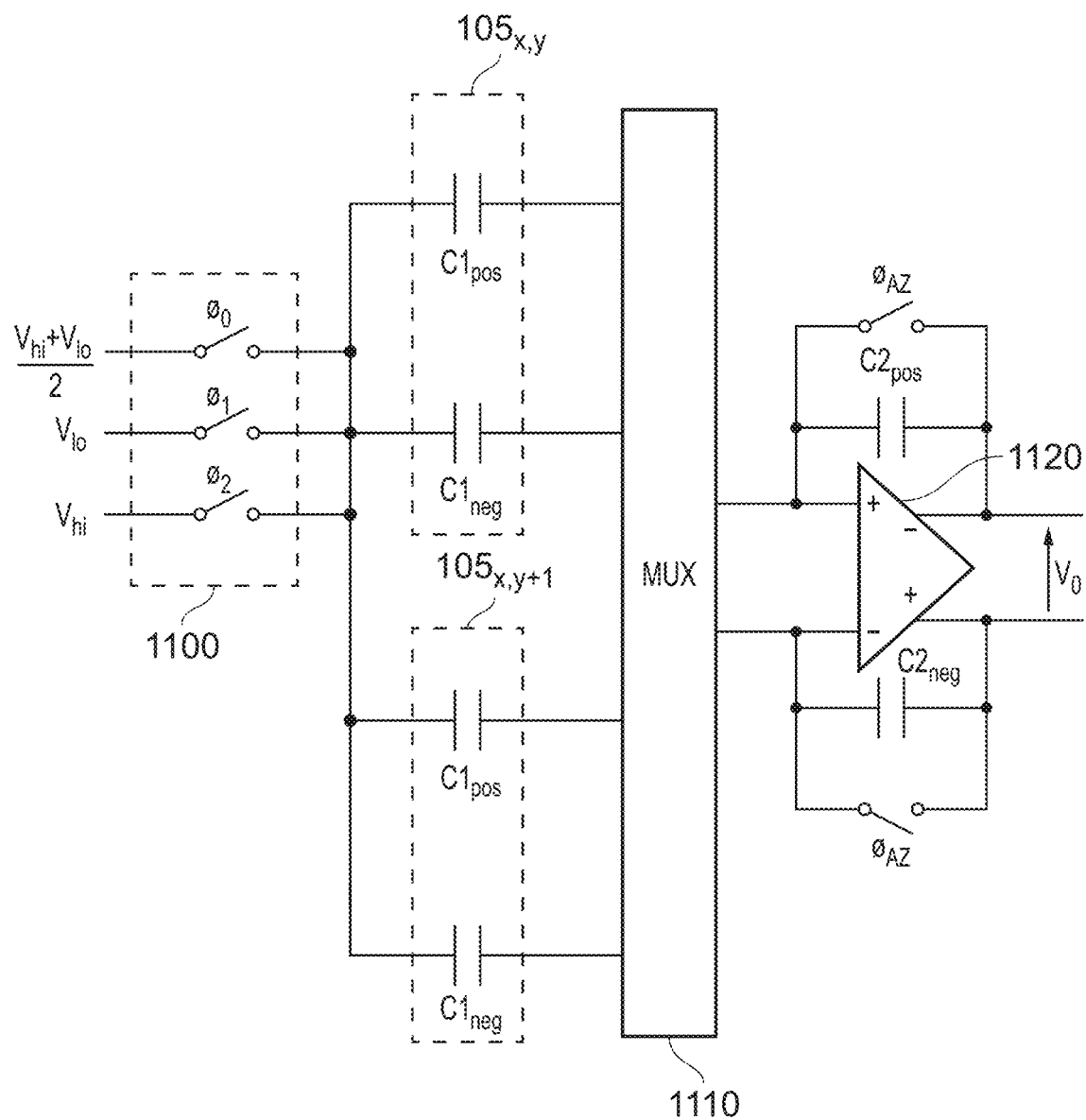
FIG. 11A shows an example schematic diagram of a fifth circuit for determining a capacitor difference value indicative of a random manufacturing difference between a pair of capacitors.

FIG. 11A shows a schematic diagram of a further alternative circuit for determining a PUF value using at least one pair of capacitors $C1_{pos}$ and $C1_{neg}$. The circuit represented in FIG. 11A shows a representation of two PUF cells $105_{x,y}$ and $105_{x,y+1}$, both coupled to the MUX 1110. However, the circuit may be implemented with any number of cells $105_{x,y}$, for example one PUF cell, four PUF cells, 16 PUF cells, 128 PUF cells, etc. Where there is only one PUF cell, MUX 1110 may be omitted and $C1_{pos}$ may be coupled to one input of the amplifier 1120 and $C1_{neg}$ may be coupled to the other input of the amplifier 1120. Whilst not represented in FIG. 11A, a chopping circuit may be arranged at the inputs to the amplifier 1120 in order to provide an input chopping function, the use and operation of which will be well understood by the skilled person.

The circuit includes a capacitive differential amplifier comprising an amplifier 1120, feedback capacitors $C2_{pos}$ and $C2_{neg}$ and whichever pair of capacitors $C1_{pos}$ and $C1_{neg}$ is coupled to the amplifier by the MUX 1110. Such a capacitive differential amplifier is typically used to amplify a signal which would appear between the first terminals of $C1_{neg}$ and $C1_{pos}$ (where the second terminals of $C1_{neg}$ and $C1_{pos}$ are coupled to the amplifier 1120 input terminals via the MUX 1110). However, in the configuration of the present disclosure, the first terminals of $C1_{neg}$ and $C1_{pos}$ are shorted together, such that the output of the capacitive differential amplifier is based on the common-mode of the input signal and the mismatch between $C1_{neg}$ and $C1_{pos}$ caused by random manufacturing differences. The circuit also includes a switch bank 1100 configured to set the voltages applied to the pair of capacitors $C1_{pos}$ and $C1_{neg}$. All of the components represented in the circuit except for the PUF cells may be implemented within a PUF determination unit, which may also include additional components such as an ADC for converting the amplifier output voltage Vo to a digital value and a control unit for controlling the switch bank, the MUX 1110 and the auto-zero switches $\phi_{AZ}$.

Figure 11B:
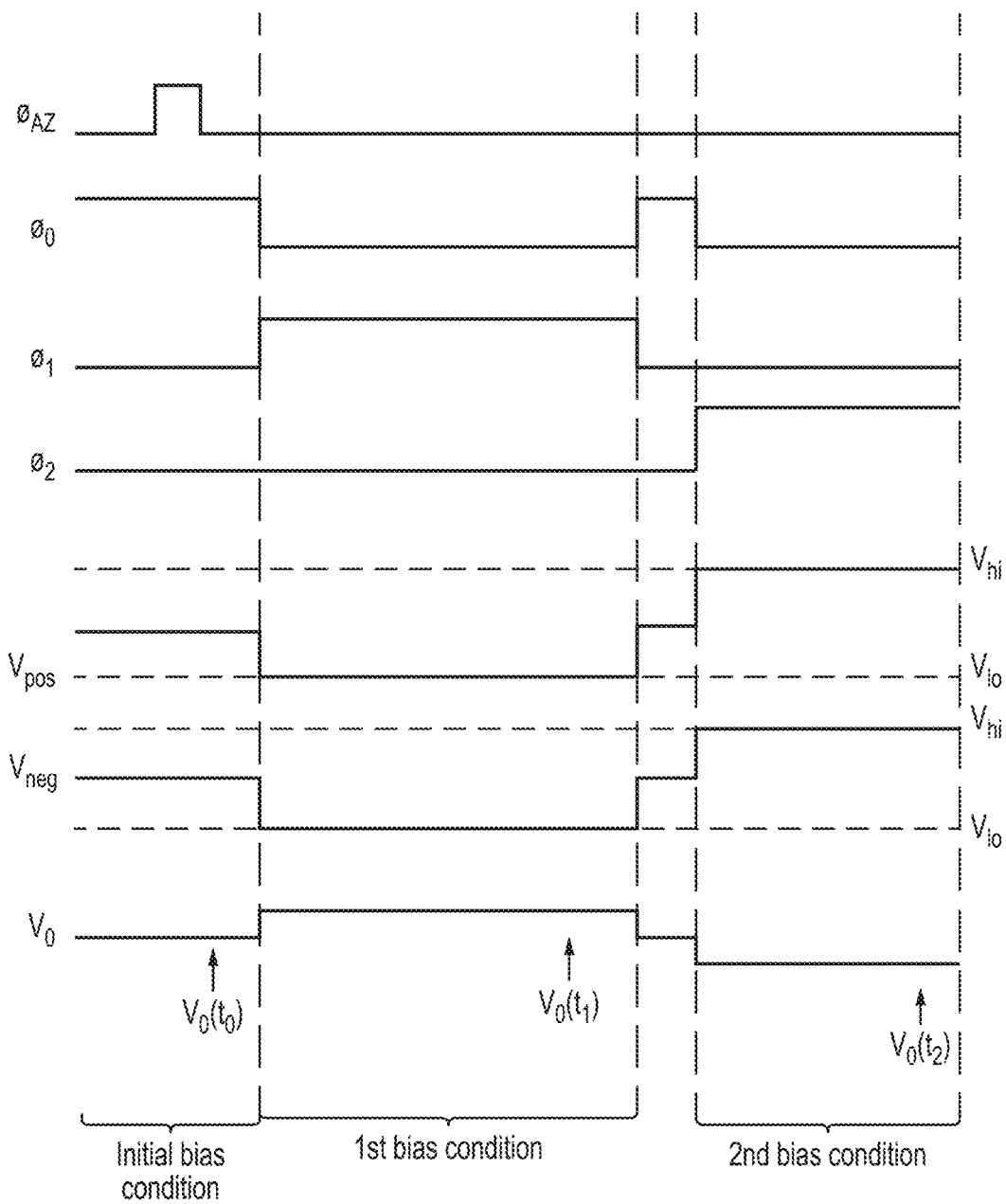
FIG. 11B shows an example schematic diagram of the operation of the circuit of FIG. 11A.

FIG. 11B shows a timing diagram representing the operation of the circuit of FIG. 11A. During the initialisation bias condition, $\phi_0$ may be held high to close the corresponding switches in the switch bank 1100 and $\phi_1$ and $\phi_2$ may be held low to open the corresponding switches in the switch bank 1100. This sets the common mode voltage at the differential inputs of the capacitive differential amplifier to the mid-voltage $(V_{hi}+V_{lo})/2$, which is the initialisation common mode voltage. During this time, the capacitive differential amplifier may also be autozeroed by closing and then opening the autozero switches using signal $\phi_{AZ}$.

At time $t_0$, the output voltage $V_o$ may be expressed as:

$$V_o(t_0)=V_{off}+V_{ci}+V_{ktc}+V_n(t_0)$$

During the first bias condition, $\phi_1$ may be held high to close the corresponding switches in the switch bank 1100 and $\phi_0$ and $\phi_2$ may be held low to open the corresponding switches in the switch bank 1100. This sets the common mode voltage at the differential inputs of the capacitive differential amplifier to the low voltage $V_{lo}$, which is the first common mode voltage.

At time $t_1$, the output voltage $V_o$ may be expressed as:

$$V_o(t_1)=V_{off}+V_{ci}+V_{ktc}+V_n(t_1)+(dC1/C2)*((V_{hi}-V_{lo})/2)$$

where dC1 is the difference in capacitance between $C1_{pos}$ and $C1_{eg}$, and C2 is the capacitance of each of the feedback capacitors $C2_{pos}$ and $C2_{neg}$. In the example of FIG. 11B, $V_o(t_1)$ is greater than $V_o(t_0)$, which is a result of $C1_{pos}$ being greater than $C1_{neg}$ by virtue of random manufacturing differences. If $C1_{pos}$ were less than $C1_{neg}$ by virtue of random manufacturing differences, then $V_o(t_1)$ would be less than $V_o(t_0)$.

A first measurement of the output voltage $V_o(t_1)$ may be taken during the first bias condition. This measurement may either be an analog measurement at the output of the capacitive differential amplifier, or a digital measurement determined by an ADC coupled to the output of the capacitive differential amplifier.

At time $t_2$, the output voltage $V_o$ may be expressed as:

$$V_o(t_2)=V_{off}+V_{ci}+V_{ktc}+V_n(t_2)-(dC1/C2)*((V_{hi}-V_{lo})/2)$$

In the example of FIG. 11B, $V_o(t_2)$ is less than $V_o(t_0)$, which is a result of $C1_{pos}$ being greater than $C1_{neg}$ by virtue of random manufacturing differences. If $C1_{pos}$ were less than $C1_{neg}$ by virtue of random manufacturing differences, then $V_o(t_2)$ would be greater than $V_o(t_0)$.

A second measurement of the output voltage $V_o(t_2)$ may be taken during the second bias condition. This measurement may either be an analog measurement at the output of the capacitive differential amplifier, or a digital measurement determined by an ADC coupled to the output of the capacitive differential amplifier.

A difference value may be determined by finding the difference between the first measurement $V_o(t_1)$ and the second measurement $V_o(t_2)$:

$$V_o(t_2)-V_o(t_1)=-(dC1/C2)*(V_{hi}-V_{lo})+V_n(t_2)-V_n(t_1)$$

Thus, it can be seen that the difference value is indicative of the random manufacturing difference, dC, between the pair of capacitors $C1_{pos}$ and $C1_{neg}$, where sample noise $V_{ktc}$, the offset $V_{off}$ and the charge injection signal $V_{ci}$, and the common mode signal, $V_{cm}$, are all cancelled out. Furthermore, any low frequency components in the readout noise $V_n(t_1)$ and $V_n(t_2)$ should also substantially cancel. Therefore, by measuring $V_o$ under both first and second bias conditions and then finding the difference, a more accurate measure of the random manufacturing difference between the two capacitors $C1_{pos}$ and $C1_{neg}$ can be found. A persistent random number, the PUF output, may then be determined based on the determined difference value, as explained earlier.

Whilst FIG. 11B shows a gap between the first and second bias conditions where the common mode input voltage of the capacitive differential amplifier is set to $(V_{hi}+V_{lo})/2$, in an alternative the circuit may be switched directly from the first bias condition to the second bias condition. Furthermore, whilst the first bias condition applies a relatively low common mode voltage and the second bias condition applies a relatively high common voltage, in an alternative the first bias condition may apply a relatively high common mode voltage and the second bias condition may apply a relatively low common mode voltage.

Where the circuit comprises a plurality of PUF cell $105_{x,y}$, and therefore a plurality of pairs of input capacitors $C1_{pos}$ and $C1_{neg}$, a first difference value may be determined by coupling one of the PUF cells $105_{x,y}$ to the amplifier 1120 using the MUX 1100 and determining $V_o(t_2)-V_o(t_1)$. The first difference value may then be used to determine a part of the persistent random number, for example one bit of the persistent random number. The MUX may then couple a different PUF cell $105_{x,y}$ to the amplifier 1120 and a second difference value may then be determined by determining $V_o(t_2)-V_o(t_1)$. The second difference value may then be used to determine a part of the persistent random number, for example a different bit of the persistent random number. This may be repeated any number of times, depending on the number of PUF cells and the number of bits in the persistent random number.

Furthermore, in one implementation all PUF cells $105x,y$ in a two-dimensional array may be coupled to a single MUX 1110 and amplifier 1120, such that only one PUF cell $105_{x,y}$ may be coupled to the amplifier 1120 at a time and one difference value may be determined at a time. In this case, a two-dimensional cell addressing arrangement may be required in order to select individual cells to be coupled to the amplifier 1120 via the MUX 1110. In an alternative, multiple sets of MUXs 1110, amplifiers 1120 and feedback capacitors $C2_{pos}$ and $C2_{neg}$ may be implemented, for example one set of MUX 1110, amplifier 1120 and feedback capacitors $C2_{pos}$ and $C2_{neg}$ for each column of a two dimensional PUF cell array. In this case, each MUX may select a row to be read-out from its column, such that parallel readout of multiple difference values may be achieved. It will be appreciated that in both single cell readout and parallel readout, there may be common excitation of all PUF cells in the array using switches ⌷₀, ⌷₁, ⌷₂, with parallel or single cell readout being achieved by suitable cell addressing.

Figure 13:
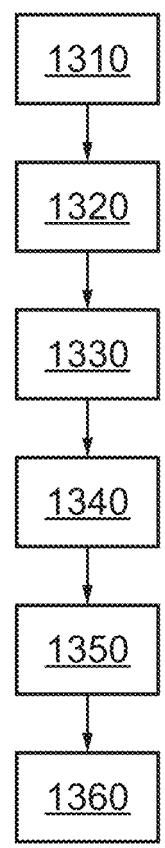
FIG. 13 shows a further example flow diagram of steps for determining a PUF output.

FIG. 13 shows an example flow diagram of steps that may be performed in order to determine a PUF output using the above described circuit. In step 1310 a first common mode voltage is applied at differential inputs of the capacitive differential amplifier. In step 1320, a first measurement of an output of the capacitive differential amplifier is determined. In step 1330, a second common mode voltage is applied at the differential inputs of the capacitive differential amplifier. In step 1340, a second measurement of the output of the capacitive differential amplifier is determined. In step 1350, a difference between the first measurement and the second measurement is determined. In step 1360, the persistent random number is determined based at least in part on the capacitor difference value.

The skilled person will readily appreciate that various alterations or modifications may be made to the above described aspects of the disclosure without departing from the scope of the disclosure.

The term 'coupled', used throughout this disclosure, encompasses both direct connections between components and indirect connections, wherein one or more intermediate component may be present in the coupling.

The array of PUF cells disclosed herein may be of any size and shape, for example with only one row and many columns, or vice-versa. Furthermore, whilst the present disclosure is generally in the context of an array of PUF cells, it will be appreciated that the plurality of PUF cells may be arranged in any suitable fashion and not necessarily as an array.

Where each PUF cell comprises two capacitor dividers, for example the implementations of FIGS. 4, 6A and 8, each cell may be configured to output a voltage or current indicative of a difference between the voltage at the common node of the first capacitor divider and the voltage at the common node of the second capacitor divider. For example, each cell may have two, unbuffered output lines, one output line coupled to the respective common nodes of the two capacitor dividers, such that the cell outputs a differential voltage indicative of the difference between the voltage at the common node of the first capacitor divider and the voltage at the common node of the second capacitor divider.

In a further alternative, each cell may comprise a pair of buffers, or a pair of amplifiers or part of amplifiers, each coupled to the respective common nodes of the two capacitor devices, such that the cells each output a buffered differential voltage or current indicative of the difference between the voltage at the common node of the first capacitor divider and the voltage at the common node of the second capacitor divider. In a further alternative, each cell may comprise a differential amplifier/buffer/comparator, or part thereof, such that the cells each output a voltage or current that is indicative of the difference between the voltage at the common node of the first capacitor divider and the voltage at the common node of the second capacitor divider.

The invention claimed is:

1. A Physical Unclonable Function, PUF, apparatus comprising:
   a plurality of PUF cells, each PUF cell comprising:
      at least one capacitor divider comprising a first capacitor and a second capacitor sharing a common node; and
   a determination unit configured to:
      set a first bias condition across the at least one capacitor divider;
      determine a first nodal measurement that is indicative of a voltage at the common node of the at least one capacitor divider during the first bias condition;
      set a second bias condition across the at least one capacitor divider to change a distribution of charge held by the first capacitor and the second capacitor;
      determine a second nodal measurement that is indicative of a voltage at the common node of the at least one capacitor divider during the second bias condition; and
      determine a PUF output based at least in part on a difference between the first measurement and the second measurement.

2. The PUF apparatus of claim 1, wherein the determination unit is further configured to:
   apply an initialisation voltage to the common node of the capacitor divider to set the charge held by the first capacitor and second capacitor.

3. The PUF apparatus of claim 1, wherein at least one of the PUF cells comprises a single capacitor divider, and
   wherein the first nodal measurement comprises a measurement of a voltage at the common node during the first bias condition; and
   wherein the second nodal measurement comprises a measurement of a voltage at the common node during the second bias condition.

4. The PUF apparatus of claim 3, wherein the at least one of the plurality of PUF cells further comprises a buffer configured to output a voltage or current indicative of the voltage at the common node of the capacitor dividers.

5. The PUF apparatus of claim 1, wherein at least one of the PUF cells comprises a first capacitor divider and a second capacitor divider, and
   wherein the first nodal measurement comprises a measurement of a difference between a voltage at the common node of the first capacitor divider and a voltage at the common node of the second capacitor divider during the first bias condition; and
   wherein the second nodal measurement comprises a measurement of a difference between a voltage at the common node of the first capacitor divider and a voltage at the common node of the second capacitor divider during the second bias condition.

6. The PUF apparatus of claim 5, wherein the at least one of the plurality of PUF cells further comprises at least one buffer configured to output a voltage or current indicative of a voltage at the common node of each of the capacitor dividers.

7. The PUF apparatus of claim 6, wherein the at least one buffer forms part of a comparator comprising a first input coupled to the common node of the first capacitor divider and a second input coupled to the common node of the second capacitor divider, wherein the PUF output is a difference between the two inputs.

8. The PUF apparatus of claim 7, wherein the comparator forms part of an analog to digital converter, and
   wherein the first bias condition comprises applying a first time-varying voltage across the first capacitor divider and a second time-varying voltage across the second capacitor divider; and
   wherein the second bias condition comprises applying a third time-varying voltage across the first capacitor divider and a fourth time-varying voltage across the second capacitor divider.

9. The PUF apparatus of claim 8, wherein the analog to digital converter comprises a slope converter or a SAR converter.

10. A method of determining a Physical Unclonable Function, PUF, output using a PUF cell comprising at least one capacitor divider comprising a first capacitor and a second capacitor sharing a common node, the method comprising:
    setting a first bias condition across the at least one capacitor divider;
    determining a first nodal measurement that is indicative of a voltage at the common node of the at least one capacitor divider during the first bias condition;
    setting a second bias condition across the at least one capacitor divider to change a distribution of charge held by the first capacitor and the second capacitor;
    determining a second nodal measurement that is indicative of a voltage at the common node of the at least one capacitor divider during the second bias condition; and
    determining the PUF output based at least in part on a difference between the first measurement and the second measurement.

11. The method of claim 10, further comprising:
    applying an initialisation voltage to the common node of the capacitor divider to set the charge held by the first capacitor and second capacitor.

12. The method of claim 10, wherein the first nodal measurement comprises a measurement of a voltage at the common node during the first bias condition, and wherein the second nodal measurement comprises a measurement of a voltage at the common node during the second bias condition.

13. The method of claim 10, wherein the PUF cell comprises a first capacitor divider and a second capacitor divider, and
    wherein the first nodal measurement comprises a measurement of a difference between a voltage at the common node of the first capacitor divider and a voltage at the common node of the second capacitor divider during the first bias condition; and
    wherein the second nodal measurement comprises a measurement of a difference between a voltage at the common node of the first capacitor divider and a voltage at the common node of the second capacitor divider during the second bias condition.

14. The method of claim 13, wherein the PUF cell is further configured to output a voltage or current indicative of a difference between the voltage at the common node of the first capacitor divider and the voltage at the common node of the second capacitor divider, and wherein the first bias condition comprises applying a first time-varying voltage across the first capacitor divider and a second time varying voltage across the second capacitor divider; and wherein the second bias condition comprises applying a third time-varying voltage across the first capacitor divider and a fourth time-varying voltage across the second capacitor divider.

15. A Physical Unclonable Function, PUF, apparatus comprising:

a PUF cell comprising:
at least one capacitor divider comprising a first capacitor and a second capacitor sharing a common node; and circuitry configured to:
set a first bias condition across the at least one capacitor divider;
determine a first nodal measurement that is indicative of a voltage at the common node of the at least one capacitor divider during the first bias condition;
set a second bias condition across the at least one capacitor divider to change a distribution of charge held by the first capacitor and the second capacitor;
determine a second nodal measurement that is indicative of a voltage at the common node of the at least one capacitor divider during the second bias condition; and
determine a PUF output based at least in part on a difference between the first measurement and the second measurement.

16. The PUF apparatus of claim 15, wherein the circuitry is further configured to:
apply an initialisation voltage to the common node of the capacitor divider to set the charge held by the first capacitor and second capacitor.

17. The PUF apparatus of claim 15, wherein the PUF cell comprises a single capacitor divider, and
wherein the first nodal measurement comprises a measurement of a voltage at the common node during the first bias condition; and
wherein the second nodal measurement comprises a measurement of a voltage at the common node during the second bias condition.

18. The PUF apparatus of claim 17, wherein the PUF cell further comprises a buffer configured to output a voltage or current indicative of the voltage at the common node of the capacitor dividers.

19. The PUF apparatus of claim 15, wherein the PUF cell further comprises at least one buffer configured to output a voltage or current indicative of a voltage at the common node of each of the capacitor dividers.

20. The PUF apparatus of claim 19, wherein the PUF cell comprises a first capacitor divider and a second capacitor divider, and wherein the buffer forms part of a comparator comprising a first input coupled to the common node of the first capacitor divider and a second input coupled to the common node of the second capacitor divider, wherein the output is a difference between the two inputs.

* * * * *